United States Patent
Villa et al.

(10) Patent No.: US 11,960,808 B1
(45) Date of Patent: Apr. 16, 2024

(54) COMPUTER-IMPLEMENTED METHOD FOR DERIVING RESISTANCE, INDUCTANCE, AND CAPACITIVE (RLC) VALUES OF AN RLC EQUIVALENT CIRCUIT MODEL ASSOCIATED WITH A FIRESET

(71) Applicant: The United States of America, as represented by the Secretary of the Navy, Arlington, VA (US)

(72) Inventors: Ciarra Villa, Ridgecrest, CA (US); Gabriel Soto, Ridgecrest, CA (US)

(73) Assignee: The United States of America, as represented by Secretary of the Navy, Washington, DC (US)

( * ) Notice: Subject to any disclaimer, the term of this patent is extended or adjusted under 35 U.S.C. 154(b) by 406 days.

(21) Appl. No.: 17/465,250

(22) Filed: Sep. 2, 2021

(51) Int. Cl.
  *G06F 30/367* (2020.01)
  *G06F 119/12* (2020.01)

(52) U.S. Cl.
  CPC ........ *G06F 30/367* (2020.01); *G06F 2119/12* (2020.01)

(58) Field of Classification Search
  USPC .......................... 716/104, 106, 107, 108, 134
  See application file for complete search history.

(56) References Cited

U.S. PATENT DOCUMENTS

| 8,165,861 B2* | 4/2012 | Guedon | G06F 30/367 703/13 |
| 9,554,738 B1* | 1/2017 | Gulati | A61B 5/0075 |
| 2013/0141112 A1* | 6/2013 | Potter | H02H 1/0015 324/523 |

* cited by examiner

*Primary Examiner* — Brian Ngo
(74) *Attorney, Agent, or Firm* — Naval Air Warfare Center Weapons Division; Jimmy M. Sauz

(57) ABSTRACT

A computer-implemented method for deriving resistance, inductance, and capacitance (RLC) values of an RLC equivalent circuit model associated with a fireset. The method may comprise steps of: acquiring and storing waveform data of a current discharge pulse capable of executing a fireset; plotting a waveform based on the waveform data; adjusting the plotted waveform by time-shifting and scaling the plotted waveform based on user input values; determining a time offset measurement and initial frequency measurement from the time-shifting and scaling steps, respectively; generating a plurality of model data based on the time offset measurement, initial frequency measurement, and user input values; determining a plurality of percentage error values corresponding to the model data; determining an ideal waveform by selecting a least of the percentage error values and associated model data; deriving ideal RLC values from the ideal waveform and associated model data; and displaying the ideal waveform and plotted waveform.

17 Claims, 9 Drawing Sheets

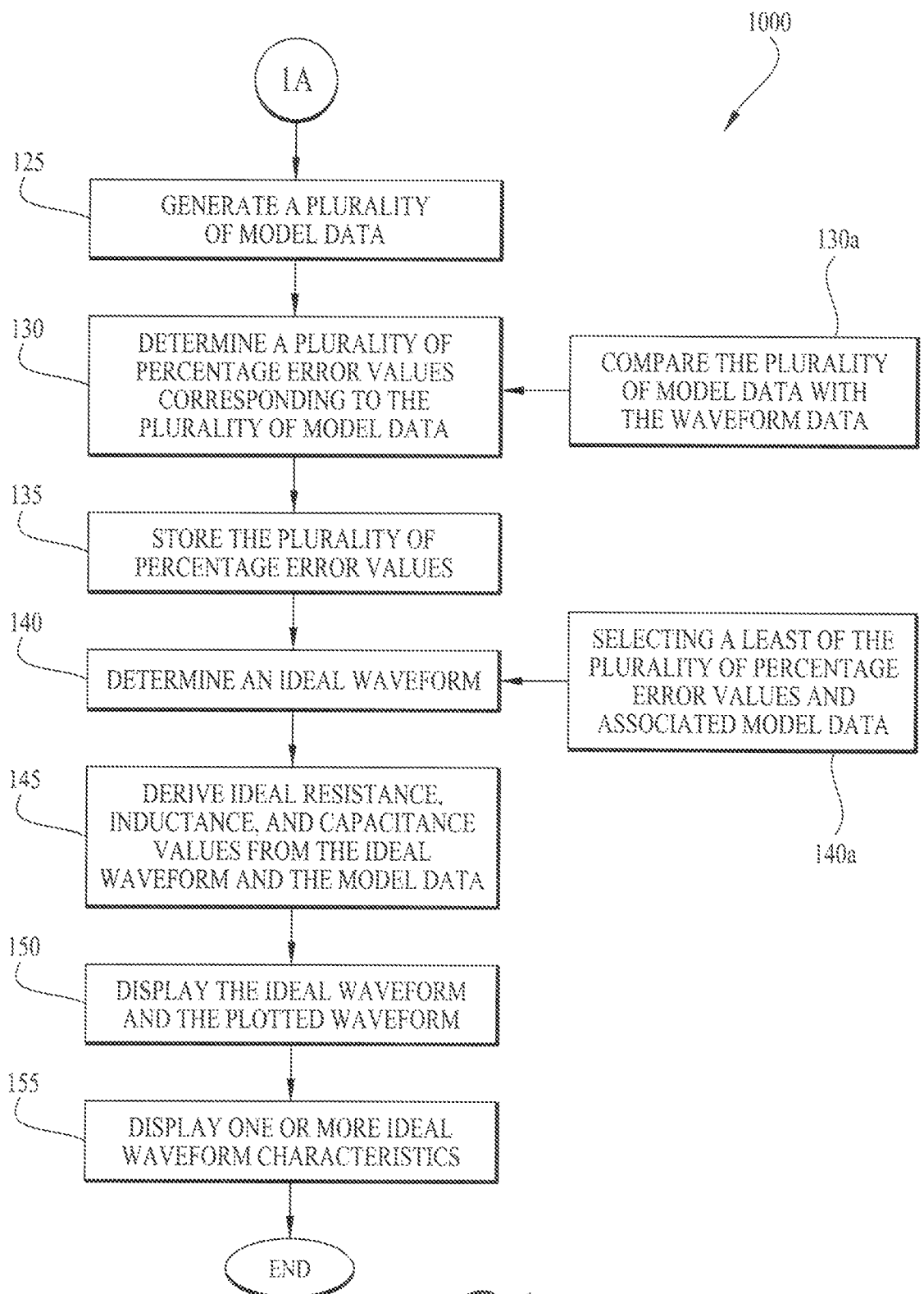

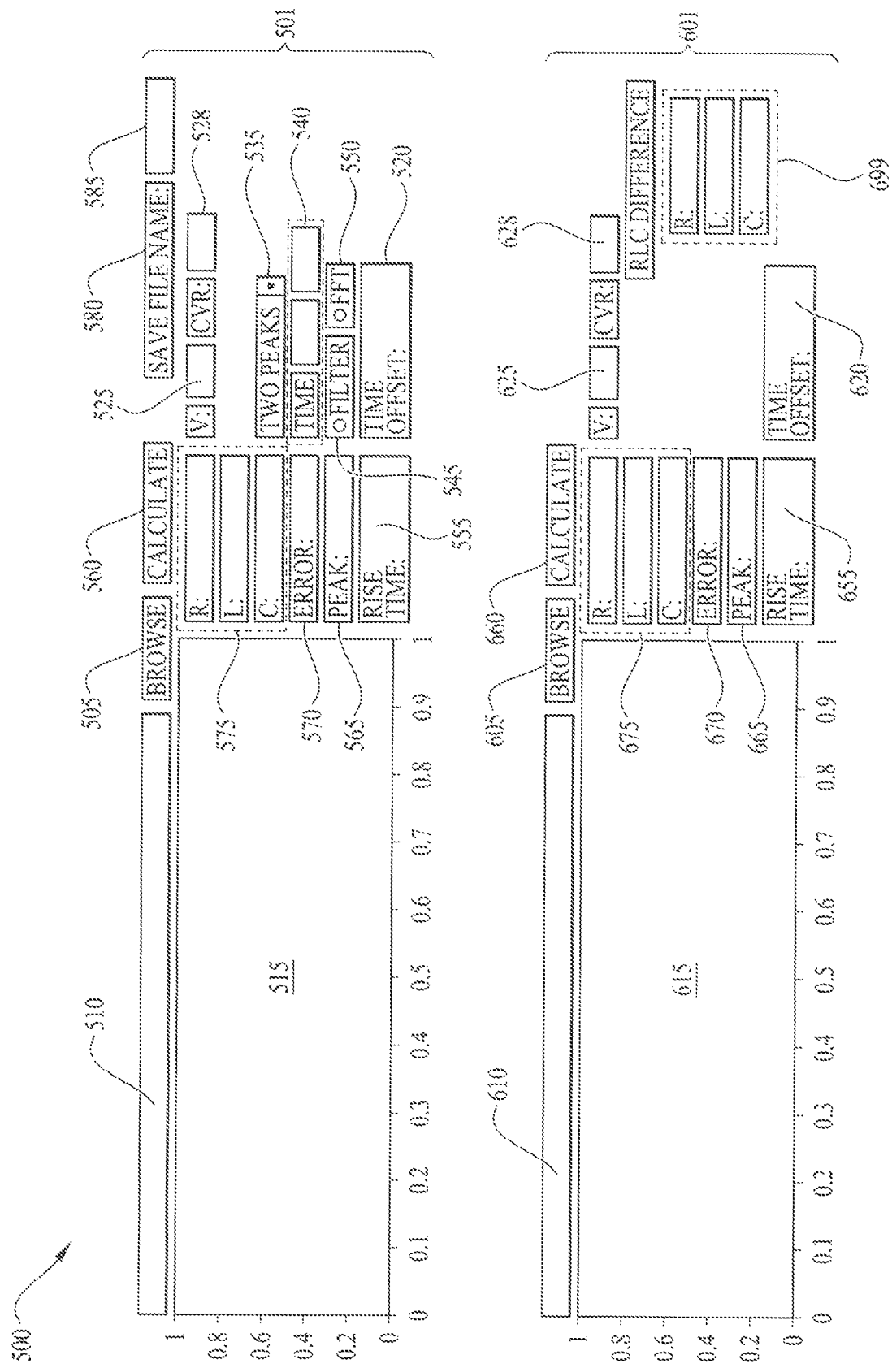

COMPUTER-IMPLEMENTED METHOD FOR DERIVING RESISTANCE, INDUCTANCE, AND CAPACITIVE (RLC) VALUES OF AN RLC EQUIVALENT CIRCUIT MODEL ASSOCIATED WITH A FIRESET

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF USE

The present disclosure relates generally to computer-implemented methods, systems, and devices configured to accurately determine RLC characteristics of an RLC equivalent circuit model for new fireset designs.

BACKGROUND

Qualification and reliability testing of a new initiation system for firesets is both time consuming and expensive. In order to minimize costs associated with these tests, various methods have been used to demonstrate the safety and reliability of a new fireset design based on their similarity to other known and qualified firesets. For instance, in determining the acceptability of new firesets in fuzes, ignition systems, and hand emplaced ordnance. MIL-DTL-23659 permits qualification by similarity if the new fireset design and qualified fireset have transient firing properties that are within a sum total of less than or equal to 25% different (i.e., total difference in resistance, inductance, and capacitance (RLC) characteristics) of the qualified fireset.

Conventional methods used for qualifying firesets include software programs that analyze a fireset's electrical properties. These software programs, however, require the user to select a set of parameters to achieve the "best-fit" waveform based on the user's judgement, an iterative trial and error process. Specifically, the user generally selects multiple points within a window to identify critical points on the waveform (such as maximums, minimums, zero crossings, slopes, etc.), wherein a fit is calculated. These points may encompass either the front, rear, or entire waveform. Given that typical waveforms can contain five to ten thousand points or more, it is highly unlikely that two users would select the exact same targeting points. Once the window is selected, a fit is determined and RLC characteristics are calculated. Complicating the process is the fact that the least error match is typically determined from a limited number of iterations, as the user adjusts initial targeting points. This may not give the most accurate determination of the fireset's electrical properties. For instance, the user may choose to match the first part of the waveform, middle of the waveform, or entire waveform. As a result, the extracted circuit values may not be the best fit for the waveform and may lead to different RLC values. As such, a significant error can be induced within the calculation and it is unlikely that someone else performing the analysis on the same data will extract the same results.

Further, many conventional software programs and systems may require the user to directly make alterations to the input file in order to analyze the data. These alterations include inverting the polarity of the signal, converting the signal to amperes from voltage, and scaling the signals to take into account the attenuation of the measuring instruments. Doing this to the raw data unfortunately can create human error. Therefore, given that these transient firing properties are used in critical applications, both from a safety and a reliability standpoint, methods used to qualify these characteristics needs to be both accurate and repeatable. In this regard, there is a need for an apparatus, system, and method capable of characterizing the RLC characteristics of new fireset designs in an accurate and repeatable fashion.

SUMMARY OF ILLUSTRATIVE EMBODIMENTS

To minimize the limitations in the related art and other limitations that will become apparent upon reading and understanding the present specification, the following discloses embodiments of a new and useful computer-implemented method for deriving resistance, inductance, and capacitive (RLC) values of an RLC equivalent circuit model associated with a fireset.

One embodiment may be a computer-implemented method for deriving RLC values of an RLC equivalent circuit model associated with a fireset, the steps comprising: acquiring, using one or more processors, waveform data of a current discharge pulse for execution of a fireset, the waveform data being stored in a memory unit; plotting, using the one or more processors, a waveform based on the waveform data; adjusting, using the one or more processors, the plotted waveform by: (1) time-shifting the plotted waveform, such that a time associated with a leading edge of a pulse is zero, and (2) scaling the plotted waveform based on one or more user input values; determining, using the one or more processors, a time offset measurement based on the time-shifting sub-step and an initial frequency measurement based on the scaling sub-step; based on (i) the time offset measurement, (ii) the initial frequency measurement, and (iii) the one or more user input values, generating, using the one or more processors, a plurality of model data; determining, using the one or more processors, a plurality of percentage error values corresponding to the plurality of model data by comparing the plurality of model data with the waveform data, wherein the plurality of percentage error values may be stored in the memory unit; determining, using the one or more processors, an ideal waveform by selecting a least of the plurality of percentage error values and associated model data; and deriving, using the one or more processors, RLC values from the ideal waveform and the associated model data. The generating step of the plurality of model data may be performed by: creating, using the one or more processors, a time offset array having a plurality of time offset values incrementally associated with the time offset measurement, the time offset array being associated with a first loop construct to be iteratively executed for at least n times, wherein n may be a number of the time offset values; creating, using the one or more processors, a frequency shift array having a plurality of frequency shift values incrementally associated with the initial frequency measurement, the frequency shift array being associated with a second loop construct to be iteratively executed for at least pXn times, wherein p may be a number of the frequency shift values; creating, using the one, or more processors, a magnitude shift array having a plurality of magnitude shift values incrementally associated with each other, the magnitude shift array being associated with a third loop construct to be iteratively executed for at least p×n×q times, wherein q may be a number of the magnitude shift values;

for each loop iteration of the n times, executing the first loop construct by: applying each of the plurality of time offset values to the waveform data; and executing each loop iteration of the second loop construct at least p×n times, wherein each loop iteration of the second loop construct may be executed by: applying each of the plurality of frequency shift values to the waveform data; and executing each loop iteration of the third loop construct at least p×n×q times, wherein each loop iteration of the third loop construct may be executed by applying each of the plurality of magnitude shift values to the waveform data; and generating, using the one or more processors, the plurality of model data based on the one or more user input values, the plurality of time offset values, the plurality of frequency shift values, and the plurality of magnitude shift values. Each of the plurality of model data may be derived based on an equation illustrated below:

$$i = \frac{V_L}{L\omega} \times e^{-\alpha t}\sin(\omega t)$$

wherein $V_i$ is an initial voltage of said current discharge pulse;
wherein R is a resistance, L is an inductance, and C is a capacitance of the RLC equivalent circuit model; and wherein:

$$\alpha = \frac{R}{2L}$$

$$\omega = \left(\frac{1}{CL} - \frac{R^2}{4L^2}\right)^{0.5} = \left(\frac{1}{CL} - \alpha^2\right)$$

The initial frequency is derived based on equation illustrated below:

$$f_0 = 2\pi\left(\frac{1}{t_1} - \frac{1}{t_0}\right)$$

wherein $f_0$ is the initial frequency and $t_1$ and $t_0$ are time values occurring at first and second peaks of two highest amplitudes of the adjusted waveform. The one or more user input values may be selected from the group of user input values consisting of: an initial firing capacitor voltage and a current viewing resistance. The computer-implemented method may further comprise the step of: displaying in a display region of a display unit, the ideal waveform and the plotted waveform, such that the ideal waveform may be superimposed with the plotted waveform.

Another embodiment may be a computer-implemented method for deriving RLC values of an RLC equivalent circuit model associated with a fireset, the steps comprising: acquiring, using one or more processors, waveform data of a current discharge pulse for execution of a fireset, the waveform data being stored in a memory unit; plotting, using the one or more processors, a waveform based on the waveform data; adjusting, using the one or more processors, the plotted waveform by: (1) time-shifting the plotted waveform, such that a time associated with a leading edge of a pulse may be zero, and (2) scaling the plotted waveform based on one or more user input values; determining, using the one or more processors, a time offset measurement based on the time-shifting sub-step and an initial frequency measurement based on the scaling sub-step; based on (i) the time offset measurement, (ii) the initial frequency measurement, and (iii) the one or more user input values, generating, using the one or more processors, a plurality of model data; determining, using the one or mom processors, a plurality of percentage error values corresponding to the plurality of model data by comparing the plurality of model data with the waveform data, wherein the plurality of percentage error values may be stored in the memory unit; determining, using the one or more processors, an ideal waveform by selecting a least of the plurality of percentage error values and associated model data; deriving, using the one or more processors, RLC values from the ideal waveform and the associated model data; and displaying in a display region using a display unit, the ideal waveform and the plotted waveform, such that the ideal waveform is superimposed with the plotted waveform. The generating step of the plurality of model data may be performed by: creating, using the one or more processors, a time offset army having a plurality of time offset values incrementally associated with the time offset measurement, the time offset array being associated with a first loop construct to be iteratively executed for at least n times, wherein n may be a number of the time offset values; creating, using the one or more processors, a frequency shift array having a plurality of frequency shift values incrementally associated with the initial frequency measurement, the frequency shift array being associated with a second loop construct to be iteratively executed for at least p×n times, wherein p may be a number of the frequency shift values; creating, using the one or more processors, a magnitude shift array having a plurality of magnitude shift values incrementally associated with each other, the magnitude shift array being associated with a third loop construct to be iteratively executed for at least p×n×q times, wherein q may be a number of the magnitude shift values; for each loop iteration of the n times, executing the first loop construct by: applying each of the plurality of time offset values to the waveform data; and executing each loop iteration of the second loop construct at least p×n times, wherein each loop iteration of the second loop construct may be executed by: applying each of the plurality of frequency shift values to the waveform data; and executing each loop iteration of the third loop construct at least p×n×q times, wherein each loop iteration of the third loop construct may be executed by applying each of the plurality of magnitude shift values to the waveform data; and generating the plurality of model data based on the one or more user input values, the plurality of time offset values, the plurality of frequency shift values, and the plurality of magnitude shift values. Each of the plurality of model data may be derived based on an equation illustrated below:

$$i = \frac{V_i}{L\omega} \times e^{-\alpha t}\sin(\omega t)$$

wherein $V_i$ is an initial voltage of said current discharge pulse;
wherein R is a resistance, L is an inductance, and C is a capacitance of the RLC equivalent circuit model; and wherein:

$$\alpha = \frac{R}{2L}$$

-continued $$\omega = \left(\frac{1}{CL} - \frac{R^2}{4L^2}\right)^{0.5} = \left(\frac{1}{CL} - \alpha^2\right)$$

The initial frequency may be derived based on equation illustrated below:

$$f_0 = 2\pi\left(\frac{1}{t_1} - \frac{1}{t_0}\right)$$

wherein $f_0$ may be the initial frequency and $t_1$ and $t_0$ may be time values occurring at first and second peaks of two highest amplitudes of the adjusted waveform. The one or more user input values may be selected from the group of user input values consisting of: an initial firing capacitor voltage and a current viewing resistance. The computer-implemented method may further comprise the step of: displaying, using the one or more processors, one or more ideal waveform characteristics in a display region of a display unit, wherein the one or more ideal waveform characteristics may be selected from the group of ideal waveform characteristics consisting of: the ideal RLC values of the ideal waveform, the percentage error value of the ideal waveform, and the time offset measurement.

Another embodiment may be a computer-implemented method for deriving RLC values of an RLC equivalent circuit model associated with a fireset, the steps comprising: acquiring, using one or more processors, waveform data of an input signal from a digital storage oscilloscope, the input signal being associated with a current discharge pulse for execution of a fireset; storing, using a memory unit, the waveform data; plotting, using the one or more processors, a waveform based on the waveform data; adjusting, using one or more processors, the plotted waveform by: (1) time-shifting the plotted waveform, such that a time associated with a leading edge of a pulse may be zero, and (2) scaling the plotted waveform based on one or more user input values; determining, using the one or more processors, a time offset measurement based on the time-shifting sub-step and an initial frequency measurement based on the scaling sub-step; based on (i) the time offset measurement, (ii) the initial frequency measurement, and (iii) the one or more user input values, generating, using the one or more processors, a plurality of model data; determining, using the one or mom processors, a plurality of percentage error values corresponding to the plurality of model data by comparing the plurality of model data with the waveform data, wherein the plurality of percentage error values may be stored in the memory unit; determining, using the one or more processors, an ideal waveform by selecting a least of the plurality of percentage error values and associated model data; deriving, using the one or more processors, RLC values from the ideal waveform and the associated model data; and displaying, using the one or more processors, one or more ideal waveform characteristics in a display region of a display unit, wherein the one or more ideal waveform characteristics may be selected from the group of ideal waveform characteristics consisting of: the ideal RLC values of the ideal waveform, the percentage error value of the ideal waveform, and the time offset measurement; and displaying in the display region using the display unit, the ideal waveform and the plotted waveform, such that the ideal waveform may be superimposed with the plotted waveform. The generating step of the plurality of model data may be performed by: creating, using the one or more processors, a time offset array having a plurality of time offset values incrementally associated with the time offset measurement, the time offset array being associated with a first loop construct to be iteratively executed for at least n times, wherein n may be a number of the time offset values; creating, using the one or more processors, a frequency shift army having a plurality of frequency shift values incrementally associated with the initial frequency measurement, the frequency shift array being associated with a second loop construct to be iteratively executed for at least p×n times, wherein p may be a number of the frequency shift values; creating, using the one or more processors, a magnitude shift array having a plurality of magnitude shift values incrementally associated with each other, the magnitude shift army being associated with a third loop construct to be iteratively executed for at least p×n×q times, wherein q may be a number of the magnitude shift values; for each loop iteration of the n times, executing the first loop construct by: applying each of the plurality of time offset values to the waveform data; and executing each loop iteration of the second loop construct at least p×n times, wherein each loop iteration of the second loop construct may be executed by: applying each of the plurality of frequency shift values to the waveform data; and executing each loop iteration of the third loop construct at least p×n×q times, wherein each loop iteration of the third loop construct may be executed by applying each of the plurality of magnitude shift values to the waveform data; and generating the plurality of model data based on the one or more user input values, the plurality of time offset values, the plurality of frequency shift values, and the plurality of magnitude shift values. Each of the plurality of model data may be derived based on an equation illustrated below:

$$i = \frac{V_i}{L\omega}e^{-\alpha t}\sin(\omega t)$$

wherein $V_i$ is an initial voltage of said current discharge pulse;
wherein R is a resistance, L is an inductance, and C is a capacitance of the RLC equivalent circuit model; and
wherein:

$$\alpha = \frac{R}{2L}$$

$$\omega = \left(\frac{1}{CL} - \frac{R^2}{4L^2}\right)^{0.5} = \left(\frac{1}{CL} - \alpha^2\right)$$

The initial frequency may be derived based on the equation illustrated below:

$$f_0 = 2\pi\left(\frac{1}{t_1} - \frac{1}{t_0}\right)$$

wherein $f_0$ may be the initial frequency and $t_1$ and $t_0$ may be time values occurring at first and second peaks of two highest amplitudes of the adjusted waveform. The one or more user input values may be selected from the group of user input values consisting of: an initial firing capacitor voltage and a current viewing resistance.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings are illustrative embodiments. They do not illustrate all embodiments. They do not set forth all embodiments. Other embodiments may be used in addition or instead. Details, which may be apparent or unnecessary, may be omitted to save space or for more effective illustration. Some embodiments may be practiced with additional components or steps and/or without all of the components or steps, which are illustrated. When the same numeral appears in different drawings, it is intended to refer to the same or like components or steps.

FIG. 4 is a schematic of one embodiment of an RLC equivalent circuit model for a fireset, according to the present disclosure.

FIG. 6 is an illustration of one embodiment of a graphical user interface used for the apparatus and method, according to the present disclosure.

DETAILED DESCRIPTION OF ILLUSTRATIVE EMBODIMENTS

Figure 1A:
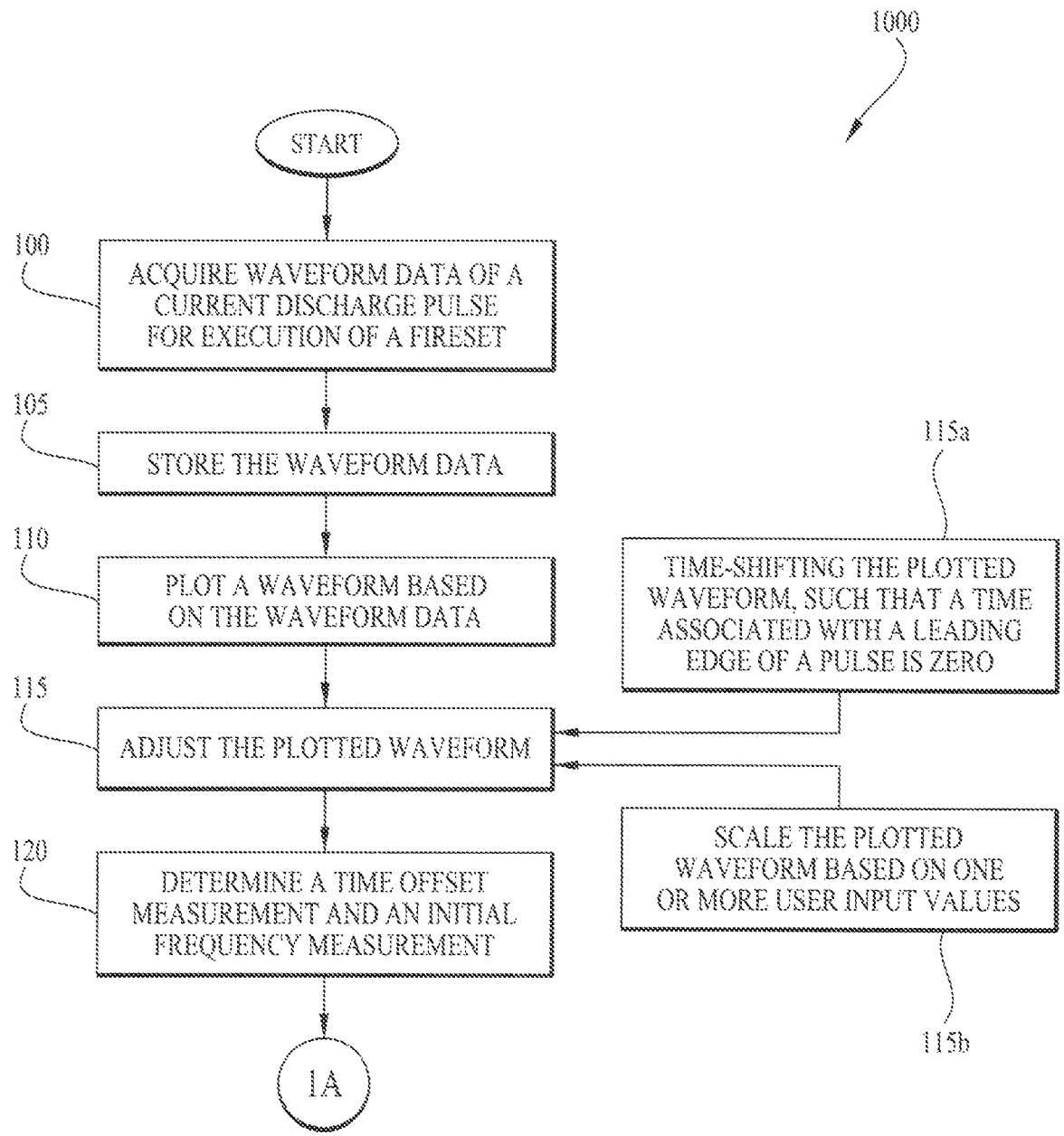
FIGS. 1A and 1B are flow charts of one embodiment of a computer-implemented method for deriving RLC values of an RLC equivalent circuit model associated with a fireset, according to the present disclosure.

In the following detailed description, numerous specific details are set forth in order to provide a thorough understanding of various aspects of one or more embodiments of the computer-implemented method for deriving RLC values of an RLC equivalent circuit model associated with a fireset. However, these embodiments may be practiced without some or all of these specific details. In other instances, well-known methods, procedures, and/or components have not been described in detail so as not to unnecessarily obscure the aspects of these embodiments.

Before the embodiments are disclosed and described, it is to be understood that these embodiments are not limited to the particular structures, process steps, or materials disclosed herein, but is extended to equivalents thereof as would be recognized by those ordinarily skilled in the relevant arts. It should also be understood that the terminology used herein is used for the purpose of describing particular embodiments only and is not intended to be limiting.

Reference throughout this specification to "one embodiment," "an embodiment," or "another embodiment" may refer to a particular feature, structure, or characteristic described in connection with the embodiment of the present disclosure. Thus, appearances of the phrases "in one embodiment" or "in an embodiment" in various places throughout this specification may not necessarily refer to the same embodiment.

Furthermore, the described features, structures, or characteristics may be combined in any suitable manner in various embodiments. In the following description, numerous specific details are provided to provide a thorough understanding of the embodiments. One skilled in the relevant art will recognize, however, that the scope of protection can be practiced without one or more of the specific details, or with other methods, components, materials, etc. . . . In other instances, well-known structures, materials, or operations are generally not shown or described in detail to avoid obscuring aspects of the disclosure.

Definitions

In the following description, certain terminology is used to describe certain features of the embodiments of the computer-implemented method for deriving RLC values of an RLC equivalent circuit model. For example, as used herein, the terms "computer", "computing device", "computer system," and "processor" refer to any device, apparatus, or machine that processes data or information with an integrated circuit chip, including without limitation, personal computers, mainframe computers, workstations, testing equipment, analog oscilloscopes, digital oscilloscopes, servers, desktop computers, portable computers, laptop computers, embedded computers, wireless devices including cellular phones, personal digital assistants, tablets, tablet computers, smartphones, portable game players, and handheld computers. Computing devices may also include mobile computing devices.

As used herein, the terms "application", "software", and "software application" generally refer to any set of machine-readable instructions on a client machine, web interface, and/or computer system, that directs a computer's processor to perform specific steps, processes, or operations disclosed herein. The "application", "software", and "software application" may comprise one or more modules that direct the operation of the processor or computer system on how to perform the method disclosed herein. For purposes of this specification, a module may be implemented as a hardware circuit comprising custom VLSI circuits or gate arrays, off-the-shelf semiconductors such as logic chips, transistors, or other discrete components. A module may also be implemented in programmable hardware devices such as field programmable arrays, programmable array logic, programmable logic devices, and the like. Modules may also be implemented in software for execution by various types of processors. An identified module of executable code may, for instance, comprise one or more physical or logical blocks of computer instructions, which may, for instance, be organized as an object procedure, or function. Nevertheless, the executables of an identified module need not be physically located together, but may comprise disparate instructions stored in different locations, which when joined logically together, may comprise the module and achieve the stated purpose for the module.

As used herein, the term "interface device" refers to a mouse, touchpad, touchscreen, joystick, trackball, keyboard, and the like.

As used herein, the terms "computer-readable medium" and "memory unit" refer to any device or component used to store data or information. Examples of such include, without limitation, a computer-readable medium device such as floppy disk, magnetic hard disk drive, universal serial bus (USB) thumb drive, and solid state hand disk, memory such as flash memory, random access memory (RAM), memory, read-only memory (ROM), optical disk, magneto-optical disk, and register files of a processor.

As used herein, unless otherwise specified, the term "substantially" refers to the complete, or nearly complete, extent or degree of an action, characteristic, property, state, structure, item, or result. As an arbitrary example, an object that is "substantially" surrounded would mean that the object is either completely surrounded or nearly completely surrounded. The exact allowable degree of deviation from absolute completeness may in some cases depend on the specific context. However, generally speaking, the nearness of completion will be so as to have the same overall result as if absolute and total completion were obtained.

The use of "substantially" is equally applicable when used in a negative connotation to refer to the complete or near complete lack of an action, characteristic, property, state, structure, item, or result. As another arbitrary example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "approximately" may refer to a range of values of ±10% of a specific value.

As used herein, the term "array" may refer to a 1-dimensional or 2-dimensional set of elements wherein each element may comprise one or more bits of data. The array elements or even the bits within elements may or may not be stored physically next to each other. While a 2-dimensional army may imply some physical relationship in a 2-dimensional image or the like, the term "2-dimensional array" does not imply that the elements/bits are stored in a 2-dimensional array or, if they are stored in a 2-dimensional army, the physical array and the conceptual array have the same dimensions. For example a 2-dimensional (conceptual) image may be stored in a 1-dimensional physical memory array. Similarly a 1-dimensional conceptual array may be stored in a 2-dimensional physical memory array.

As used herein the term "somewhat" refers to a range of values of 50% of a specific value.

As used herein, the term "about" is used to provide flexibility to a numerical range endpoint by providing that a given value may be "a little above" or "a little below" the endpoint. In some cases, the term "about" is to include a range of not more than about two inches of deviation.

By way of illustration, a numerical range of "about 1 inch to about 5 inches" should be interpreted to include not only the explicitly recited values of about 1 inch to about 5 inches, but also include individual values and sub-ranges within the indicated range. Thus, included in this numerical range are individual values such as 2, 3, and 4 and sub-ranges such as from 1-3, from 2-4, and from 3-5.

This same principle applies to ranges reciting only one numerical value and should apply regardless of the breadth of the range or the characteristics being described.

Distances, forces, weights, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

This same principle applies to ranges reciting only one numerical value and should apply regardless of the breadth of the range or the characteristics being described.

As used herein in this disclosure, the singular forms "a" and "the" may include plural referents, unless the context clearly dictates otherwise.

The present disclosure relates generally to computer-implemented methods, systems, and devices configured to accurately determine RLC characteristics of an equivalent RLC circuit model used for new fireset designs. In general, qualification and reliability testing of a new initiation system for firesets is both time consuming and expensive. In order to minimize costs associated with these tests, various methods have been used to demonstrate the safety and reliability of a new fireset design based on their similarity to other known and qualified firesets. For instance, in determining the acceptability of new firesets in fuzes, ignition systems, and hand emplaced ordnance, MIL-DTL-23659 permits qualification by similarity if the new fireset design and qualified fireset have transient firing properties that are within a 25% threshold (i.e., total difference in resistance, inductance, and capacitance (RLC) characteristics) of the qualified fireset.

Conventional methods used for qualifying firesets include software programs that analyze a fireset's electrical properties. These software programs, however, require the user to select a set of parameters to achieve the "best-fit" waveform based on the user's judgement, an iterative trial and error process. Specifically, the user generally selects multiple points within a window to identify critical points on the waveform (such as maximums, minimums, zero crossings, slopes, etc.), wherein a fit is calculated. These points may encompass either the font, rear, or entire waveform. Given that typical waveforms can contain five to ten thousand points or more, it is highly unlikely that two users would select the exact same targeting points. Moreover, once the window is selected, a fit is determined and RLC characteristics are calculated. Complicating the process is the fact that the least error match is typically determined visually from a limited number of iterations, as the user adjusts initial targeting points. This may not give the most accurate determination of the fireset's electrical properties. For instance, the user may choose to match the first part of the waveform, middle of the waveform, or entire waveform. As a result, the extracted circuit values may not be the best fit for the waveform and may lead to different RLC values. As such, a significant error can be induced within the calculation and it is unlikely that someone else performing the analysis on the same data will extract the same results.

Further, many conventional software programs and systems may require the user to directly make alterations to the input file in order to analyze the data. These alterations include inverting the polarity of the signal, converting the signal to amperes from voltage, and scaling the signals to take into account the attenuation of the measuring instruments. Doing this to the raw data unfortunately can create human error. Therefore, given that these transient firing properties are used in critical applications, both from a safety and a reliability standpoint, methods used to qualify these characteristics needs to be both accurate and repeatable. In this regard, there is a need for a device, system, and method capable of characterizing the RLC characteristics of new fireset designs in an accurate and repeatable fashion.

Embodiments of method, system, and apparatus disclosed herein solve these problems by characterizing new fireset designs in an accurate and repeatable fashion. These embodiments may include a method comprising the steps of: acquiring and storing waveform data of a current discharge pulse from the execution of a fireset; plotting a waveform based on the waveform data; adjusting the plotted waveform by time-shifting and scaling the plotted waveform based on user input values; determining a time offset measurement and initial frequency measurement from the time-shifting and scaling steps; generating a plurality of model data based on the time offset measurement, initial frequency measurement, and user input values; determining a plurality of percentage error values corresponding to the model data; determining an ideal waveform by selecting a least percentage error value and associated model data; deriving ideal RLC values and associated model data from the loaded waveform; and displaying the ideal waveform and plotted waveform. As a result, unlike the conventional method of characterizing firesets discussed above, embodiments of computer-implemented method may be performed repeatedly, more accurately, and with minimal user input.

In the accompany drawings, like reference numbers indicate like elements. Reference character 1000 depicts various embodiments of the computer-implemented method for deriving RLC values of an RLC circuit model associated with a fireset.

Figure 1:
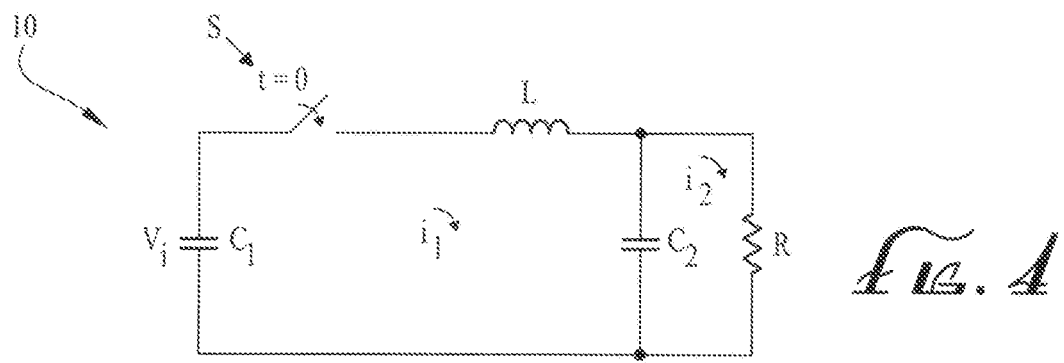

FIGS. 1A and 1B are flow charts of one embodiment of a computer-implemented method 1000 for deriving RLC values of an RLC equivalent circuit model associated with a fireset, according to the present disclosure. As shown in FIG. 1, one embodiment of the method 1000 may comprise steps 100, 105, 110, 115, 115*a*, 115*b*, 120, 125, 130, 130*a*, 135, 140, 140*a*, 145, 150, 155, which preferably involves minimal user input.

Beginning at step 100 of FIG. 1A, the user preferably acquires waveform data of a current discharge pulse from execution of a fireset. The waveform data may be obtained by measuring an input signal associated with a ringdown, and the input-signal may be obtained from a digital storage oscilloscope during measurement. The waveform data may also be stored into a memory unit for further analysis by a processor, as shown in step 105. For example, in one embodiment of the method 1000, the user may acquire waveform data by utilizing a comma-separated values (.csv) file containing the waveform data associated with the current discharge pulse (step 100). This waveform data may be copied or directly transferred from the digital oscilloscope (where the user first measured the input signal of the current discharge pulse), and the .csv file containing the waveform data may then be uploaded to the computer system or processor, according to method 1000, without alterations. In an alternative embodiment, the waveform data may be manually inputted or edited by the user. The processor may then automatically locate the waveform data from the .csv file and perform adjustments.

Specifically, in various embodiments, the method 1000 may further comprise steps 110, 115, which may be plotting a waveform based on the waveform data (step 110) and adjusting the plotted waveform (step 115). Upon analyzing the waveform data, the processor may plot a waveform in order to display the waveform to the user (step 110). This waveform data derived from the .csv file previously may then be redisplayed accordingly with the appropriate scaling factor used in the user's measuring method. Additionally, the processor may also adjust the plotted waveform (step 115) by correcting the orientation of the waveform, if needed, and/or shifting the beginning of the leading edge of the pulse. In particular, the processor, for instance, may time-shift the plotted waveform, such that the leading edge of the pulse is associated with time zero (step 115*a*). The processor may also obtain a time-offset measurement from the time-shifting step in order to scale the plotted waveform for further analysis.

Importantly, the processor may also scale the plotted waveform based on one or more user input values (step 115*b*). In this manner, the plotted waveform may be displayed and scaled over a meaningful range of magnitudes during a proper time duration. In an exemplary embodiment, user input values entered by the user may include (1) the maximum voltage charged or stored by a high voltage capacitor prior to discharge (i.e., natural response of the RLC circuit) and (2) current viewing resistance (i.e., load resistance of diagnostic component used for measuring the input signal). The current viewing resistance (CVR) may be used to determine the scaling factor needed to scale the waveform. Since data captured by a scope is typically measured in voltage, the CVR value is needed to convert the voltage to current using I=V/R. In this manner, upon performing steps 115*a* to 115*b*, the processor may adjust the plotted waveform, such that the discharge pulse is plotted along with the rise time value of the first and tallest peak as measured from 10% to 90% rise time to reach that peak.

Turning to step 120, in order to initialize the waveform data, the method 1000 may include the step of determining a time offset measurement and an initial frequency measurement. As stated above, the processor may obtain the time offset measurement (step 115*a*) by calculating the difference in the time shift of the plotted waveform from $t_0=0$ (i.e., the leading edge of the pulse is associated with time zero). The initial frequency measurement, on the other hand, may be obtained by calculating the reciprocal difference of two time stamps associated with the two tallest peaks from the adjusted waveform and multiplying the reciprocal difference by $2\pi$. Thus, in an embodiment, the initial frequency may be derived from the following equation:

$$f_0 = 2\pi\left(\frac{1}{t_1} - \frac{1}{t_o}\right)$$

where $f_0$ is the initial frequency and $t_1$ and $t_0$ are time values occurring at first and second peaks of two highest amplitudes of the adjusted waveform. This initial frequency measurement $f_0$ may provide a starting point for the frequency shift and may be used in step 125 in FIG. 1B and step 205 in FIG. 2A below.

Upon obtaining the (i) time offset measurement, (ii) initial frequency measurement, and (iii) user input values, the method 1000 may proceed to step 125, which is generating a plurality of model data. Here, the (i) time offset measurement, (ii) initial frequency measurement, and (iii) user input values, may be used to determine an ideal waveform with the closest fit to the plotted waveform or original pulse. In particular, the processor may generate several arrays (i.e., time offset array, frequency shift array, magnitude shift array), and these arrays may hold variables that are incrementally associated with each other (i.e., variables that increase or decrease incrementally in value). Notably, the values within the time offset array and frequency shift array may be based on the time offset measurement and initial frequency measurement, respectively. The magnitude shift array may contain fixed values that increase incrementally and that do not depend on any measurements. Therefore, when applying each variable within the time offset array, frequency shift array, and magnitude shift army in combination, the processor may generate multiple model data based on these combinations of variables. Additional details and sub-steps regarding step 125 is further discussed below in FIGS. 2A and 2B.

After generating the model data in step 125, the method 1000 may proceed to step 130, which is determining a plurality of percentage error values corresponding to the plurality of model data. Here, each model data generated by the processor is preferably compared with the original waveform data of the current discharge pulse obtained in step 100 (step 130*a*). By comparing the new model data with the original waveform data, a percentage error value can be calculated to determine the variability between the original waveform data and new model data. Each percentage error value may be determined using a percent error formula, and the percentage error value of each combination of values are saved and preferably stored in the memory unit for later analysis (see step 135). The percentage error value may be calculated by summing the absolute values of the differences(s) between each point of the two original waveform and the new model waveform, divided by the absolute value of each point in the original waveform and multiplying the result by 100 to return as percentage. Steps 130, 130*a* are preferably repeated for each model waveform dataset, and the process continues until all the values within the arrays have been evaluated.

Using the percentage error values, the computer-implemented method 1000 may proceed to step 140, which is determining an ideal waveform. Here, the saved error percentage values from steps 130, 135 are preferably recalled, and the processor then preferably performs a minimum value search of the multiple percentage error values. By seeking the least percentage error value, the ideal waveform may be determined due to the minimum variability with the original waveform. Further, by using the model data associated with the ideal waveform, the associated user input values, time offset value, frequency shift value, and magnitude shift values may also be recalled.

Upon determining the ideal waveform, the processor may derive the ideal RLC values from the ideal waveform and model data (step 145). In addition to selecting a minimum value or least of the percentage error values, the user input values, time offset value, frequency shift value, and magnitude shift values associated with the model waveform dataset may also be recalled (step 145*a*). These values may be used by the processor to derive the equivalent resistance, inductance, and capacitance values of the ideal waveform, which is discussed further below in FIG. 4.

Finally, the method 1000 may proceed to steps 150, 155. Here, both the ideal waveform and the plotted waveform may be displayed, such that the ideal waveform is superimposed with the plotted waveform (step 150). Additionally, one or more ideal waveform characteristics may be displayed (step 155). In particular, the RLC values of the ideal waveform may be displayed to the user along with the original and ideal waveform for visual observation. The error percentage value and time offset measurement may also be displayed. The user can now record their fireset's current discharge pulse's resistance, inductance, and capacitance values and have an error value associated with the overall fit with ease.

Figure 2A:
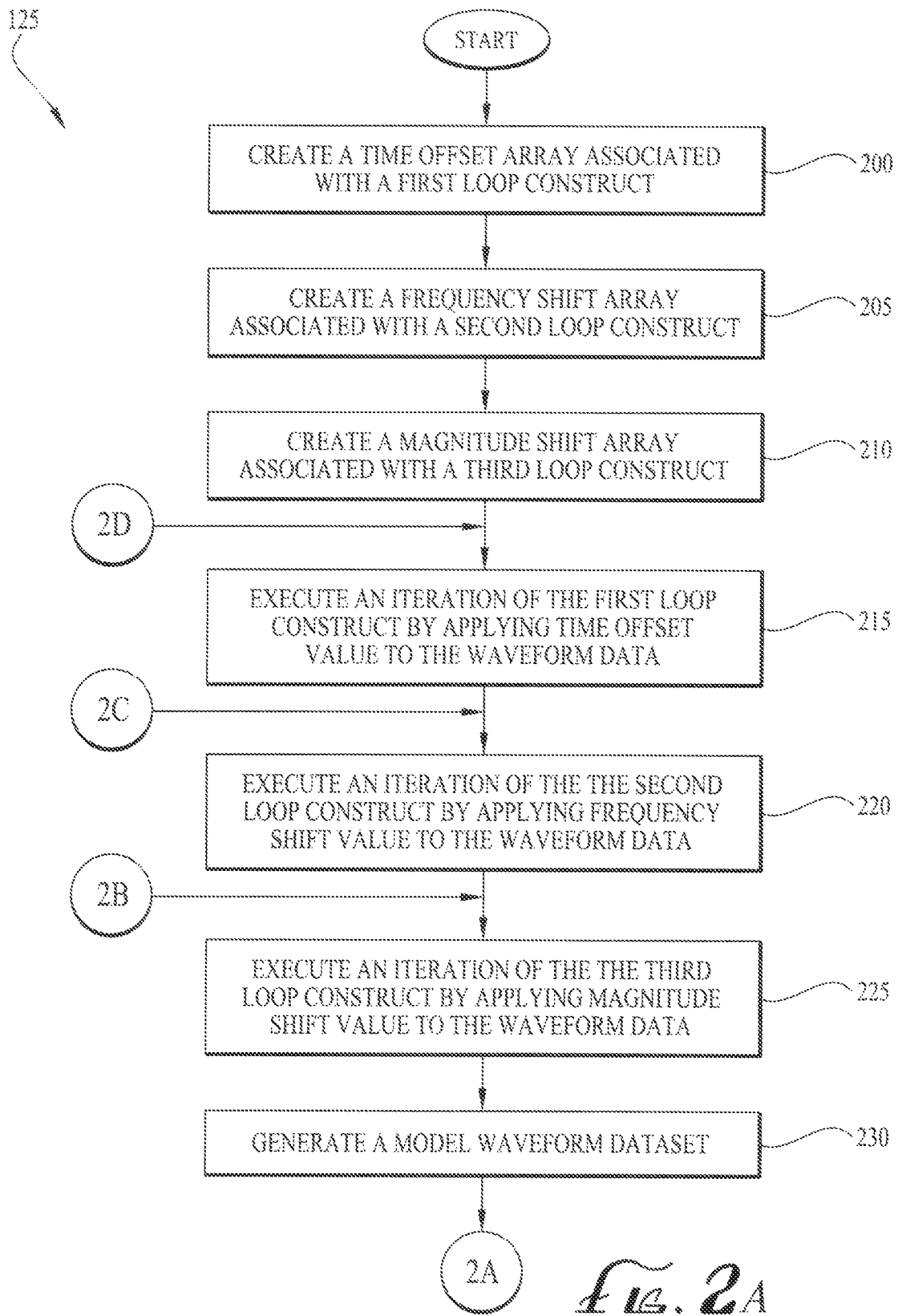
FIGS. 2A and 2B are flow charts depicting one embodiment of a step for generating a plurality of model data.
Figure 2B:
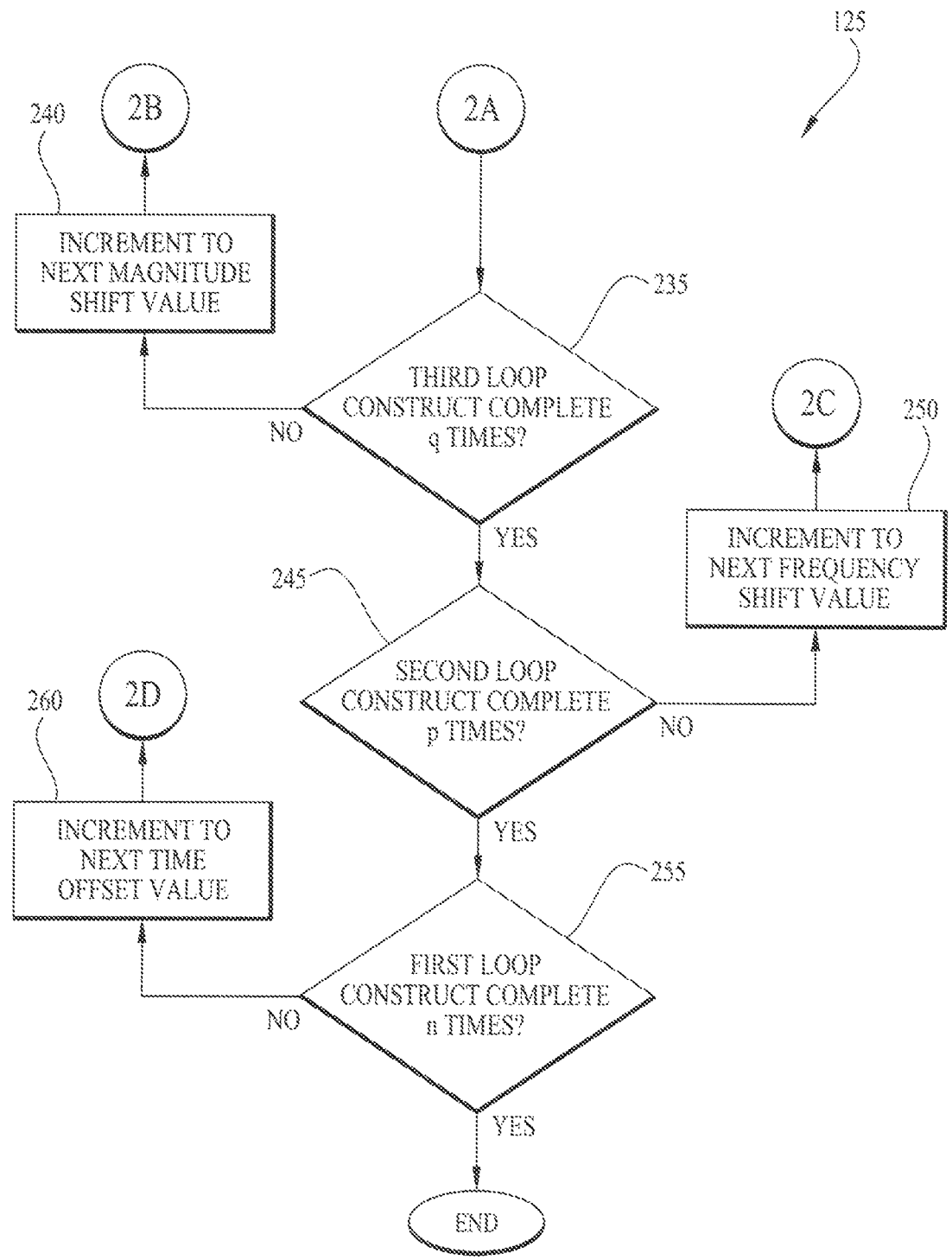

FIGS. 2A and 2B are flow charts depicting one embodiment of a step 125 for generating a plurality of model data. As shown in FIGS. 2A and 2B, one embodiment of step 125 may comprise sub-steps 200, 205, 210, 215, 220, 225, 230, 235, 240, 245, 250, 255, 260. FIG. 2A shows that an embodiment of step 125 may begin with sub-steps 200, 205, 210, which may involve creating a time offset array, frequency shift array, and magnitude shift array. These arrays are preferably created to provide various combinations of variables to generate multiple model data. In this regard, each model data may be analyzed to determine the best combination of values.

Specifically, one embodiment of step 125 may begin by creating a time offset array associated with a first loop construct (sub-step 200) and frequency shift array associated with a second loop construct (sub-step 205). As recited above, an array may be a 1-dimensional or 2-dimensional set of elements, wherein each element may comprise one or more bits of data. The data stored within each array element may represent time offset values or frequency shift values incrementally related to the time offset measurement and initial frequency measurement, respectively (i.e., each element stored within the time offset array and frequency shift array may comprise values that increase or decrease incrementally in relation with each other). The time offset array and frequency shift array may also be associated with a first loop construct and second loop construct, respectively, such that the time offset values and frequency shift values may be incrementally applied to the modeled waveform in order to create various combinations and thus determine the best combination of values for an ideal waveform.

Preferably, the time offset array may comprise n elements (wherein n is a number of time offset values stored in the time offset array) and may be associated with a first loop construct, such that the time offset array may be iteratively executed for at least n times. Similarly, the frequency shift army may comprise p elements (wherein p is a number of frequency shift values stored within the frequency shift array) and may be associated with a second loop construct, such that the frequency shift array may be iteratively executed for at least p times. Given that various embodiments of the method 1000 may have the frequency shift array nested within the time offset array (or vice versa) when executing loop constructs, the exhaustive combination of values for both the time offset array and frequency shift array may be iteratively executed for at least p×n times.

Step 125 may further comprise the additional sub-step 210 of creating a magnitude shift array associated with a third loop construct. Like the time offset array and frequency shift array, the magnitude shift array may include elements or values that are incrementally associated with each other (i.e., each element stored within the magnitude shift array may comprise magnitude shift values that increase or decrease incrementally in relation with each other). Unlike the time offset array and frequency shift array, however, the magnitude shift army preferably includes fixed values, which are not generated based on a particular measurement or user input. For example, in one embodiment, elements stored within the magnitude shift army may represent a fixed set of values of −50 to +50 Amperes that incrementally increase or decrease with relation to each other. These fixed set of values are also preferably added to the original waveform data for the creation of new model data.

The magnitude shift array may comprise q elements (wherein q is the number of magnitude shift values stored within the magnitude shift array) and may be associated with a third loop construct, such that the magnitude shift array may be iteratively executed for at least q times. Given that various embodiments of the method 1000 may have the magnitude shift array nested within both the time offset array and frequency shift army for loop execution, the exhaustive combination of values for the time offset array, frequency shift array, and magnitude shift array altogether may be iteratively executed for at least p×n×q times.

FIG. 2A also show that step 125 may further comprise sub-steps 215, 220, 225, which are: executing an iteration of the first loop construct by applying a time offset value to the waveform data (sub-step 215); executing an iteration of the second loop construct by applying a frequency shift value to the waveform data (sub-step 220); and executing an iteration of the third loop construct by applying a magnitude shift value to the waveform data (sub-step 225). Here, by applying a single iteration of the time offset value, frequency shift value, and magnitude shift value to the waveform data, a combination of each array element may be applied to the original waveform data in order to create a single model data associated with a new waveform.

In particular, an element of the time offset array may be applied to the original waveform data (sub-step 215) in order to adjust the time-scale of the model waveform. Similarly, an element of the frequency shift array may be applied to the waveform data (sub-step 220) in order to adjust the frequency of the model waveform. Further, an element of the magnitude shift array may be applied to the original waveform data (sub-step 225) in order to adjust the magnitude of the model waveform (e.g., peak current). Accordingly, once a time offset value. frequency shift value, and magnitude shift value are selected from the arrays, the processor may generate a single model data associated with a new model waveform (step 230). Further, each model data may be created by the equation(s) or algorithm(s) described below (i.e., when referring to the RLC equivalent circuit model in FIG. 4), using the initial firing capacitor voltage, time scale value, frequency value, and magnitude value.

Given that each array comprises p×n×q elements, wherein each element are incremented with a variable offset from each other (i.e., time offset array comprises n elements; frequency shift array comprises p elements; magnitude shift array comprises q elements), a range of combinations may be derived to create multiple model data. Additional details on how each element of the time offset array, frequency shift array, and magnitude shift array are iteratively applied am described below in sub-steps 235, 240, 245.250, 255, 260 in FIG. 2B.

Turning to sub-steps 235, 240, the method 1000 may execute the third loop construct associated with the magnitude shift army. Here, sub-step 235 checks whether all magnitude shift values within the magnitude shift array have been iteratively executed and applied to the original waveform q times for each p iteration associated with the second loop construct. Importantly, FIG. 2B shows that sub-step 235 may be a third loop construct nested within the second loop construct of sub-step 245, and that sub-step 245 may be a second loop construct nested within the first loop construct of sub-step 255. In this manner, if all the magnitude shift values within the magnitude shift array have not been applied to the waveform data, a counter may be incremented (step 240) to the next magnitude shift value (element $q_{n+1}$), and from there, the method 1000 may proceed back to sub-steps 225 and 230 in order to apply the next magnitude shift value (element $q_{n+1}$) to create another model data using element n of the time offset value and element p of the frequency shift value. As a result, sub-steps 235, 240, 225, 230 are preferably repeated q times for all elements within the magnitude shift array. In this manner, variable offsets of the magnitude shift value may be applied for each new model data.

After all the magnitude shift values of the magnitude shift array have been iteratively applied to the waveform data in sub-step 235, the method 1000 may proceed in executing the second loop construct associated with the frequency shift array. Here, sub-step 245 checks whether frequency shift values within the frequency shift array have been iteratively applied and executed to the original waveform p times for each of n iterations associated with the first loop construct. Importantly, FIG. 2B shows that sub-step 245 is a second loop construct nested within the first loop construct of sub-step 255, and that sub-step 235 is a third loop construct nested within the second loop construct of sub-step 245. In this manner, if all the frequency shift values within the frequency shift array have not been applied to the waveform data, a counter may be incremented (step 250) to the next frequency shift value (element $p_{n+1}$), and from there, the method 1000 may proceed back to sub-steps 220, 225, 230 in order to apply the next frequency shift value (element $p_{n+1}$) to create another model data using element n of the time offset value. The third loop construct is also executed again in sub-steps 235, 240. As a result, sub-steps 235, 240, 225, 230 are preferably repeated q times for all elements within the magnitude shift array for the new frequency shift value. Variable offsets of the frequency shift measurement and magnitude shift value may also be applied to create additional new model data.

After all the frequency shift values of the frequency shift array have been iteratively applied to the waveform data in sub-step 245, the method 1000 may proceed in executing all iterations of the first loop construct associated with the time offset array. Here, in sub-step 255, the processor may check to see whether time offset values within the time offset array have been iteratively applied n times to the original waveform. Importantly, FIG. 2B shows that the second loop construct (sub-steps 245, 250) and third loop construct (sub-steps 235, 240) am nested within the first loop construct. In this manner, if all the time offset values within the time offset array have not been applied to the waveform data, a counter may be incremented (step 260) to the next time offset value (element $n_{n+1}$), and from there, the method 1000 may proceed back to sub-steps 215, 220, 225, 230 in order to apply a next time offset value (element $n_{n+1}$) to create another model data. The second loop construct and third loop construct are also executed again in sub-steps 235, 240, 245, 250. As a result, sub-steps 225, 230, 235, 240 are preferably repeated q times for all elements within the magnitude shift array for the new frequency shift value. Additionally, sub-steps 220, 225, 230, 235, 240, 245, 250, am preferably repeated p×q times for all elements within the frequency shift array and magnitude shift array for the new time offset value. Variable offsets of the time offset measurement, frequency shift measurement, and magnitude shift value may also be applied to create multiple new model data.

Upon executing all iterations of the first loop construct, second loop construct, and third loop construct at sub-step 255, the exhaustive combination of all values for the time offset array, frequency shift array, and magnitude shift array should be iteratively executed at least p×n×q times to create exhaustive combinations of the model data. As such, step 125 may be completed to proceed onto step 130 to calculate a plurality of percentage error values at least-p×n×q times.

In various embodiments, each percentage error values may be determined during each execution of the loop(s) such that the array is filled with each iteration of p, q, and n. Thus, each percentage error value may be performed through each iteration of the loop constructs, and for each percentage error value obtain, the method 1000 may determine the least percentage error (i.e., minimal error) by comparing each percentage value to the previous error value.

Figure 3:
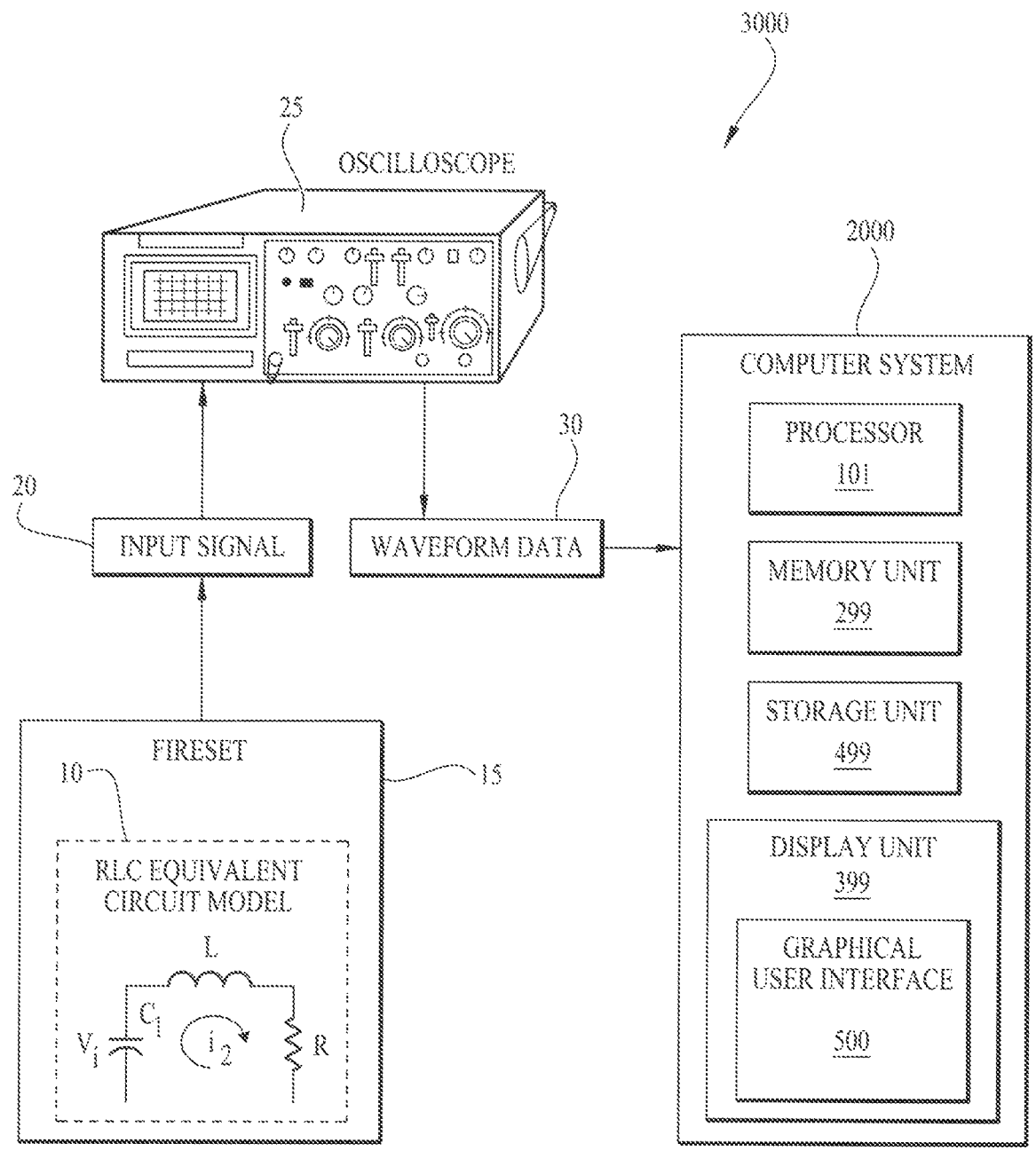
FIG. 3 is an illustration of one embodiment of a system for deriving RLC values from an RLC equivalent circuit model of a fireset, according to the present disclosure.

FIG. 3 is an illustration of one embodiment of a system 3000 for deriving RLC values from an RLC equivalent circuit model 10 of a fireset 15. according to the present disclosure. As shown in FIG. 3, one embodiment of the system 3000 may comprise a fireset 15, oscilloscope 25, and computer system 2000, wherein the computer system 2000 may comprise: a processor 101, memory unit 299, storage unit 499, and display unit 399 capable of displaying a graphical user interface 500.

FIG. 3 also shows how the computer system 2000 may derive RLC characteristics of an RLC equivalent circuit model 10. The fireset 15, which is the firing unit configured to detonate an explosive commonly used in military and industrial applications, includes an initiator designed to trigger a detonator to initiate the detonation reaction in explosive materials. The transient firing properties associated with the fireset 15 are generally driven by the RLC characteristics of the RLC equivalent circuit model 10 that drives the initiator.

Notably, these RLC characteristics are not directly measurable but may be determined by analyzing the waveform measured by an oscilloscope 25. The oscilloscope 25 may be used to observe waveforms on a display (e.g., ringdowns) in order to verify proper operation, and measurements may be obtained from the fireset 15 via an input signal 20 associated with a current discharge pulse of the fireset 15. The diagnostic component of the oscilloscope used for measuring the input signal 20 may be a current viewing resistor (CVR), current viewing transformer (CVT), or both. Preferably, the oscilloscope 25 may be a digital storage oscilloscope configured to acquire, capture, process, and save waveform data associated with the input signal 20 of the fireset 15.

Upon capturing the ringdown of the fireset 15 via the input signal 20, waveform data 30 may be generated by the oscilloscope 25, and that waveform data 30 may be sent, transmitted, or uploaded to a computer system 2000. The computer system 2000 generally comprises basic components of a processor, memory for storing data, software, and input/output devices (e.g., display, data recorder, data storage) and is preferably configured to analyze the waveform data 30. In particular, the computer system 2000 is preferably configured to analyze and determine the RLC characteristics of the fireset 15 and may comprise a processor 101, memory unit 299, storage unit 499, and display unit 399. The processor 101 may be configured to execute executable instructions (e.g., software) and may comprise circuitry or any processor capable of processing the executable instructions. The memory unit 299 is preferably configured to store waveform data 30 and may include storage devices, without limitation, random access memory (RAM), read only memory (ROM), RAM cache, virtual memory. The waveform data 30 within the memory unit 299 may be cleared or ultimately transferred to a storage unit 499, which may include any storage configured to retrieve and store data such as flash drives, hard drives, optical drives, and/or magnetic tape.

Each of the memory unit 299 and the storage unit 499 may comprise a computer-readable medium, which stores instructions or programs executable by the processor 101, and a graphical user interface 500 may be displayed to the user in order for the user to analyze and derived the RLC characteristics of the fireset 15. Additional details about the graphical user interface 500 are discussed further below.

FIG. 4 is a schematic of one embodiment of an RLC equivalent circuit model 10 for a fireset 15, according to the present disclosure. As shown in FIG. 4 the RLC equivalent circuit model 10 may comprise a switch S, capacitors $C_1$, $C_2$, inductor L, and resistor R. FIG. 4 depicts two capacitors $C_1$, $C_2$ in order to depict distributed capacitance due to a strip line associated with capacitor $C_2$.

Importantly, the RLC values can be derived from the RLC equivalent model 10, shown in FIG. 4. Using Kirchhoff's current law, the following equations may be used $$\frac{V_i}{s} = i_1 \left( \frac{1}{C_1 s} + Ls \right) + \frac{1}{C_2 s}(i_1 - i_2) \qquad \text{Equation 1}$$

$$R(i_2) = \frac{1}{C_2 s}(i_1 - i_2) \qquad \text{Equation 2}$$

When solving Equation for $i_2$, we can get the following equation:

$$\frac{V_i}{s} = i_1 \left( \frac{1}{C_1 s} + Ls \right) + \frac{1}{C_2 s}(i_1 - i_2)$$

$$V_i = i_1 \left( \frac{1}{C_1} + Ls^2 \right) + \frac{1}{C_2}(i_1 - i_2)$$

$$V_i = i_1 \left( \frac{1}{C_1} + Ls^2 \right) + \frac{1}{C_2}(i_1 - i_2)$$

$$V_i = i_1 \left( \frac{1}{C_2} + \frac{1}{C_1} + Ls^2 \right) - \frac{1}{C_2}(i_2)$$

$$V_i - i_1 \left( \frac{1}{C_2} + \frac{1}{C_1} + Ls^2 \right) = -\frac{1}{C_2}(i_2)$$

$$i_2 = \frac{V_i - i_1 \left( \frac{1}{C_2} + \frac{1}{C_1} + Ls^2 \right)}{\left( -\frac{1}{C_2} \right)}$$

$$i_2 = -C_2 V_i + C_2 i_1 \left( \frac{1}{C_2} + \frac{1}{C_1} + Ls^2 \right)$$

Subsequently, solving Equation a for $i_1$ provides the following equation:

$$R(i_2) = \frac{1}{C_2 s}(i_1 - i_2)$$

$$RC_2 s(i_2) = (i_1 - i_2)$$

$$(1 + RC_2 s)(i_2) = (i_1)$$

Additionally, by substituting $i_1$ into Equation 1, we can obtain the following equation:

$$i_2 = -C_2 V_i + C_2 (1 + RC_2 s)(i_2) \left( \frac{1}{C_2} + \frac{1}{C_1} + Ls^2 \right)$$

$$i_2 = -C_2 V_i + C_2 (i_2) \left( \frac{1}{C_2} + \frac{1}{C_1} + Ls^2 \right) + C_2 (RC_2 s)(i_2) \left( \frac{1}{C_2} + \frac{1}{C_1} + Ls^2 \right)$$

$$i_2 = -C_2 V_i + (i_2) \left( 1 + \frac{C_2}{C_1} + C_2 Ls^2 \right) + (RC_2 s)(i_2) \left( 1 + \frac{C_2}{C_1} + C_2 Ls^2 \right)$$

-continued $$i_2\left(1 - 1 - \frac{C_2}{C_1} - C_2 L s^2 - RC_2 s - \frac{RC_2^2 s}{C_1} - \frac{RLC_2^2 s^3}{C_1}\right) = -C_2 V_i$$

$$i_2\left(-\frac{C_2}{C_1} - C_2 L s^2 - RC_2 s - \frac{RC_2^2 s}{C_1} - \frac{RLC_2^2 s^3}{C_1}\right) = -C_2 V_i$$

$$i_2\left(\frac{1}{C_1} + Ls^2 + Rs + \frac{RC_2 s}{C_1} + \frac{RLC_2 s^3}{C_1}\right) = V_i$$

$$i_2 = \frac{V_i}{\frac{1}{C_1} + Ls^2 + Rs + \frac{RC_2 s}{C_1} + \frac{RLC_2 s^3}{C_1}}$$

$$i_2 = \frac{V_i}{\frac{1}{C_1} + Rs + \frac{RC_2 s}{C_1} + Ls^2 + \frac{RLC_2 s^3}{C_1}}$$

For the first case, if $C_2 = 0$, then:

$$i_2 = \frac{V_i}{\frac{1}{C_1} + Rs + Ls^2}$$

$$i_2 = \frac{V_i / L}{\frac{1}{LC_1} + \frac{R}{L} s + s^2}$$

$$i_2 = \frac{V_i}{L} \times \frac{1}{s^2 + \frac{R}{L} s + \frac{1}{LC_1}}$$

Given the Laplace transforms and dropping the subscripts:

$$e^{-\alpha t} \sin(\omega t) = \frac{\omega}{(s+a)^2 + \omega^2}$$

$$i = \frac{V_i}{L\omega} \times \frac{\omega}{s^2 + \frac{R}{L} s + \frac{1}{LC}}$$

It can be shown that:

$$\alpha = \frac{R}{2L}$$

$$\omega = \left(\frac{1}{CL} - \frac{R^2}{4L^2}\right)^{0.5} = \left(\frac{1}{CL} - \alpha^2\right)$$

$$i = \frac{V_i}{L\omega} \times e^{-\alpha} \sin(\omega t)$$

Given that $\sin(\omega t)$ is periodic, the difference between the time of any two peeks is $2\pi$. Therefore:

$$\omega t_2 - \omega t_1 = 2\pi$$

$$\omega = 2\pi/(t_2 - t_1)$$

Which should be a close estimate of $\omega$ for our equation, and not exactly due to the exponential component of the equation.
Accordingly, we can solve for L:

$$i = \frac{V_i}{L\omega} \times e^{-\alpha t} \sin(\omega t)$$

-continued $$L = \frac{V_i}{i\omega} \times e^{-\alpha} \sin(\omega t)$$

We solve this for the first current peak ($i_{a1}$ at time $t_1$) with the given $V_i$ We can now solve for a using any point on the ringdown using $$i = \frac{V_i}{L\omega} \times e^{-\alpha} \sin(\omega t)$$

But we will use the ratio of two points to try to improve accuracy of fit. We will use points ($i_{a1}$, $t_1$) and ($i_{a2}$, $t_2$).

$$\frac{i_{a1}}{i_{a2}} = \frac{\frac{V_i}{L\omega} \times e^{-\alpha t_1} \sin(\omega t_1)}{\frac{V_i}{L\omega} \times e^{-\alpha t_2} \sin(\omega t_2)}$$

$$\frac{i_{a1}}{i_{a2}} = \frac{e^{-\alpha t_1} \sin(\omega t_1)}{e^{-\alpha t_2} \sin(\omega t_2)}$$

$$\frac{i_{a1}}{i_{a2}} = \left(e^{\alpha(t_2 - t_1)}\right) \frac{\sin(\omega t_1)}{\sin(\omega t_2)}$$

$$\ln\left(\frac{i_{a1}}{i_{a2}}\right) = \ln\left(e^{\alpha(t_2 - t_1)}\right) + \ln\left(\frac{\sin(\omega t_1)}{\sin(\omega t_2)}\right)$$

$$\ln\left(\frac{i_{a1}}{i_{a2}}\right) - \ln\left(\frac{\sin(\omega t_1)}{\sin(o t_2)}\right) = \alpha(t_Z - t_1)$$

$$\ln\left(\frac{\frac{i_{a1}}{i_{a2}}}{\frac{\sin(\omega t_1)}{\sin(\omega t_2)}}\right) = \alpha(t_2 - t_1)$$

$$\ln\left(\frac{i_{a1} \sin(\omega t_2)}{i_{a2} \sin(\omega t_1)}\right) = \alpha(t_2 - t_1)$$

$$\frac{\ln\left(\frac{i_{a1} \sin(\omega t_2)}{i_{a2} \sin(\omega t_1)}\right)}{(t_2 - t_1)} = \alpha$$

Once we have $\alpha$, we can calculate R:

$$\alpha = \frac{R}{2L}$$

$$R = 2L\alpha$$

And we can calculate C:

$$\omega = \left(\frac{1}{CL} - \frac{R^2}{4L^2}\right)^{0.5}$$

$$\omega^2 = \left(\frac{1}{CL} - \frac{R^2}{4L^2}\right)$$

$$\frac{1}{CL} = \omega^2 + \frac{R^2}{4L^2}$$

$$CL = \frac{1}{\omega^2 + \frac{R^2}{4L^2}}$$

-continued $$C = \frac{1}{\left(\omega^2 + \frac{R^2}{4L^2}\right)L}$$

$$C = \frac{1}{L(\omega^2 + \alpha^2)}$$

Alternatively, if $C_2>0$ or $C_2<0$, then we can use the following equation:

$$i_2 = \frac{V_i}{\frac{1}{C_1} + Rs + \frac{RC_2 s}{C_1} + Ls^2 + \frac{RLC_2 s^3}{C_1}}$$

$$i_2 = \frac{V_i}{\left(\frac{1}{C_1} + Rs + Ls^2\right) + \left(\frac{RC_2 s}{C_1} + \frac{RLC_2 s^3}{C_1}\right)}$$

Figure 5A:
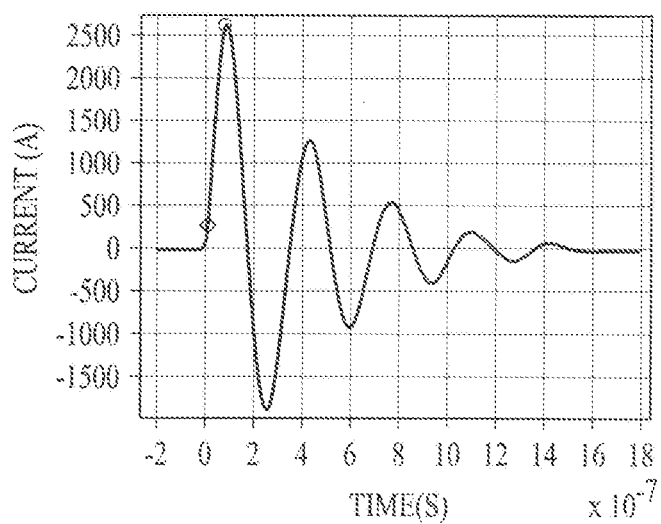
FIGS. 5A and 5B show graphs of ringdowns, according to some embodiments, and depict the ability of the fireset to deliver energy.
Figure 5B:
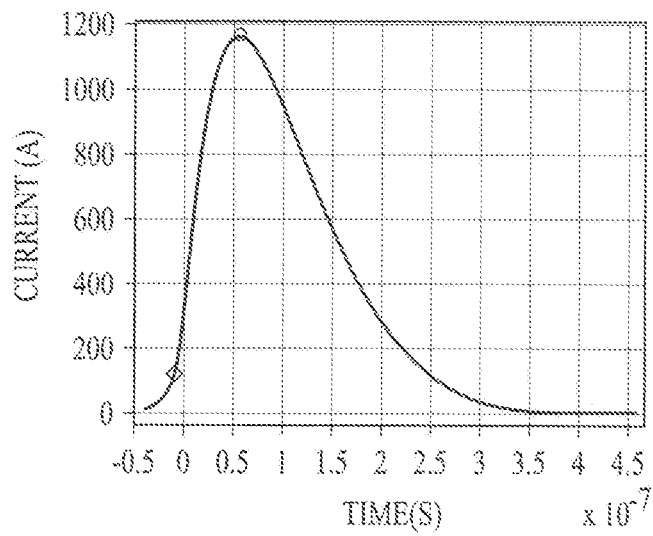

FIGS. 5A and 5B show graphs of ringdowns, according to some embodiments, and depict the ability of the fireset 15 to deliver energy. Specifically, FIG. 5A depicts a ringdown into a short with a peak of 2657 A with a rise time of 71 ns, which are generally easier to use in determining the RLC characteristics of the fireset. FIG. 5B depicts a ringdown into a half ohm load having a peak of 1155 A with a rise time of 65 ns. These ringdowns generally provide a good indication of the fireset's ability when firing an exploding foil initiator.

FIG. 6 is an illustration of one embodiment of a graphical user interface 500 used for the computer system 2000 and method 1000, according to the present disclosure. As shown in FIG. 6, one embodiment of the graphical user interface 500 may comprise a first interface 501 and second interface 601, each of which may be configured to analyze the RLC characteristics of waveform data 30. Importantly, the first interface 501 and second interface 601 of the graphical user interface 500 may analyze and compare two distinct waveform data (e.g., first and second waveform data 30). Thus, when used in conjunction, the first interface 501 and second interface 601 of the graphical user interface 500 may be used to analyze and compare the RLC characteristics of two waveform signals. For example, in an exemplary embodiment, the first interface 501 (e.g., upper portion of the graphical user interface 500) may be used to analyze the RLC characteristics of a qualified fireset, which can be used as a baseline. The second interface 601 (e.g., bottom portion of the graphical user interface 500), on the other hand, may be used to analyze the RLC characteristics of a new fireset 15, which can be compared against the baseline.

FIG. 6 shows that the first interface 501 of the graphical user interface 500 may comprise: a first browse button 505, first folder path field 510, first display region 515, first time offset field 520, first firing capacitor voltage input field 525, first current viewing resistor (CVR) input field 528, first rise time field 555, first calculate button 560, first peak field 565, first error percentage value field 570, first RLC value field 575, save file button 580, and file name input field 585. Similarly, FIG. 6 also shows that the second interface 601 of the graphical user interface 500 may comprise: a second browse button 605, second folder path field 610, second display region 615, second time offset field 620, second firing capacitor voltage input field 625, second CVR input field 628, second rise time field 655, second calculate button 660, second peak field 665, second error percentage value field 670, and second RLC value field 675.

After acquiring waveform data associated with a current discharge pulse of a qualified fireset, the user may upload that waveform data into the first interface 501 of the graphical user interface 500. Here, according to the illustrative embodiment, the user may select the browse button 505 and search for the source file associated with the waveform data 30 of the qualified fireset (e.g., .csv file). In an alternative embodiment, the user may select the folder path and item name of the source file (or the path and name of any existing content item) as the new path and name. Upon selection of the source file, the folder path of the source item may be displayed in the folder path field 510 in order for the user to verify whether the desired source file of the waveform data 30 has been selected.

Subsequently, the processor 101 may then automatically locate the waveform data 30, plot the waveform, and perform adjustments. Specifically, in various embodiments, a waveform associated with the uploaded waveform data 30 may be plotted on the first display region 515 of the graphical user interface 500, as for example shown in FIGS. 7 and 8. This plotted waveform 700 may be displayed as a two-dimensional plot of current over the time domain and may be scaled over a meaningful range of magnitudes during a proper time duration.

When adjusting the plotted waveform 700 within the display region 515, the orientation of the plotted waveform 700 may be corrected, if needed (e.g., negative versus positive orientation). Additionally, the leading edge of the pulse of the plotted waveform 700 may be time-shifted, such that the pulse edge starts at time zero (shown in FIG. 7). By time-shifting the plotted waveform here, a time offset measurement may be obtained and used to scale the plotted waveform 700 in order to depict proper time duration. The time offset measurement may be displayed in time offset field 520.

Importantly, as discussed above in step 1156 of the method 1000, the scaling or adjusting of the plotted waveform 700 may be based on one or more user input values. For example, a user must input into the firing capacitor voltage field 525 the maximum voltage charged or stored by a high voltage capacitor prior to discharge. Additionally, as recited in step 115b, the user may also input into the CVR input field 528 the current viewing resistance used for measuring or recording the input signal associated with the waveform data. The CVR resistance values may be used to determine the scaling factor needed to scale the waveform into a proper current values.

FIG. 6 also shows that an embodiment of the graphical user interface 500 may comprise a calculate button 560. Here, the user may select the calculate button 560 to initialize and analyze the waveform data 30. The processor 101 may first determine the time offset measurement by measuring the time difference of the plotted waveform from $t_0=0$ (i.e., when the time associated with the leading edge of the pulse waveform is zero) (i.e., step 115a of the method 1000). The processor 101 may also determine the initial frequency measurement by calculating the reciprocal difference of two time stamps of the two tallest peaks in the waveform and multiplying the reciprocal difference by $2\pi$ (i.e., step 1156 of the method 1000). Upon obtaining the (i) time offset measurement, (ii) initial frequency measurement, and (iii) user input values of the firing capacitor voltage and CVR resistance, multiple model data may be generated along with their corresponding percentage error values. Subsequently, the processor 101 may determine the ideal waveform 750 (i.e., best-fit waveform) by selecting the model data 30 associated with the least percentage error value or lowest percentage error, which may provide minimum variability from the plotted waveform 700. This percentage error value may be displayed in error percentage value field 570.

Once the ideal waveform 750 is determined, the associated RLC values may be derived from the ideal waveform 750 and shown within the RLC value field 575. Other values may also be determined and displayed such as the maximum amplitude in peak field 565 and associated pulse rise time in the rise time field 555. The plotted waveform 700 and ideal waveform 750 may be also be displayed in the display region 515, such that both waveforms are superimposed (step 150). The user can now record their fireset's current discharge pulse's resistance, inductance, and capacitance equivalent values by creating a new file name in file name input field 585 and saving a copy via the save file button 580. For purposes of FIGS. 6-8, the plotted waveform 700 and associated ideal waveform 750 may be may be used as a baseline against a second waveform described further below.

After acquiring and analyzing waveform data 30 of a qualified fireset 15 based on the above, the user may proceed in analyzing second waveform data 30 associated with the current discharge pulse of a new fireset 15. Specifically, the user may perform similar steps to the second interface 601 of the graphical user interface 500. First, the user may upload second waveform data 30 of the new fireset 15 by selecting the second browse button 605 and searching for the source file associated with the second waveform data 30 (e.g., .csv file). Upon selection of the desired file, the folder path may be displayed in the second folder path field 610 in order for the user to verify whether the correct source item has been selected.

Figure 8:
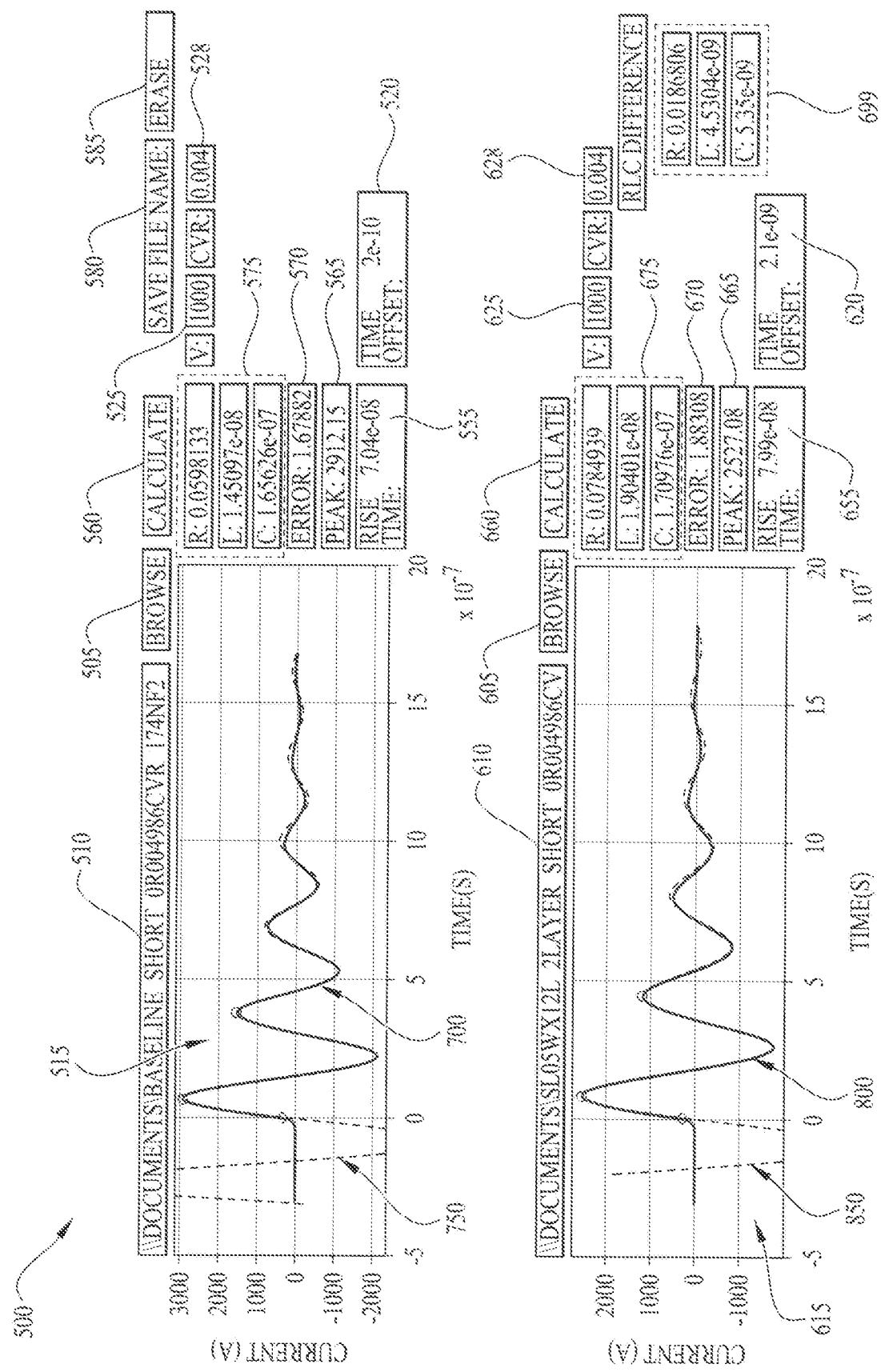
FIG. 8 is an illustration of one embodiment of the graphical user interface and shows the graphical user interface analyzing and comparing two waveforms.

Subsequently, the processor 101 may then automatically locate the second waveform data 30, plot the second waveform, and perform adjustments. Specifically, in various embodiments, a second waveform of the new fireset may be plotted based on the second waveform data 30 (step 110) on the second display region 615 of the graphical user interface 500, as shown in FIG. 8. The second plotted waveform 800 may be displayed as a two-dimensional plot of current (shown in FIG. 8) over the time domain and may also be scaled over a meaningful range of current magnitude over a proper time duration.

When adjusting the second plotted waveform 800, the orientation of the second plotted waveform 800 may be corrected, if needed. Additionally, the beginning of the leading edge of the pulse may be time-shifted, such that the pulse edge start at time zero. Further, by time-shifting the second plotted waveform 800, the time-offset measurement obtained from the time-shifting step may be used to scale the second plotted waveform 800 in order to depict proper time duration. This time-offset measurement may be displayed in the second time offset field 620.

Importantly, as discussed above, the scaling or adjusting of the second plotted waveform 800 may be based on one or more user input values. For example, a user may input into the second firing capacitor voltage field 625 the maximum voltage of the second waveform charged or stored by a high voltage capacitor prior to discharge. Additionally, as recited in step 115b, the user may also input into the second CVR input field 628 the current viewing resistance used for measuring or recording the input signal associated with the waveform data 30. Altogether, like the user input values inputted in the first interface 501 above, CVR resistance values may be used to determine the scaling factor needed to time-scale the second plotted waveform 800 into the proper time range or duration.

FIG. 6 also shows that the second interface 601 of the graphical user interface 500 may comprise a second calculate button 660. Here, the second calculate button 560 may be selected, which may initialize and analyze the waveform data 30 of the second plotted waveform 800. The processor 101 may first determine the time offset measurement by measuring the time difference of the second plotted waveform 800 from $t_0=0$ (i.e., when the time associated with the leading edge of the pulse waveform is zero) (step 115a of the method 1000). The processor 101 may also determine the initial frequency measurement of the second plotted waveform 800 (step 115b). Upon obtaining the (i) time offset measurement, (ii) initial frequency measurement, and (iii) user input values, multiple model data may be generated along with their corresponding percentage error values. As a result, the processor 101 may determine the second ideal waveform 850 (i.e., best-fit waveform) by selecting the model data having the least percentage error value or lowest percentage error, which may provide minimum variability from the second plotted waveform 850. This percentage error value may be displayed in second percentage error value field 670.

Once the second ideal waveform 850 is determined, the associated RLC values may be derived from the second ideal waveform 850 and shown within the second RLC value field 675. Other values may also be depicted such as the maximum current in the second peak field 665 and the pulse rise time in the second rise time field 645. The second ideal waveform 850 and the second plotted waveform 800 may be also displayed in the second display region 615, such that the second ideal waveform 850 and second original waveform 800 are superimposed, as shown in FIG. 8. Given that the RLC values of the first ideal waveform 750 and second ideal waveform 750 are obtained, the RLC difference, as measured in resistance, inductance, and capacitance values, may be displayed in the RLC difference fields 699 (shown in FIG. 8) for further analysis. The data and analysis obtained from both waveforms may be recorded and saved by creating a new file name in file name input field 585 and saving a copy via the save file button 580.

Figure 7:
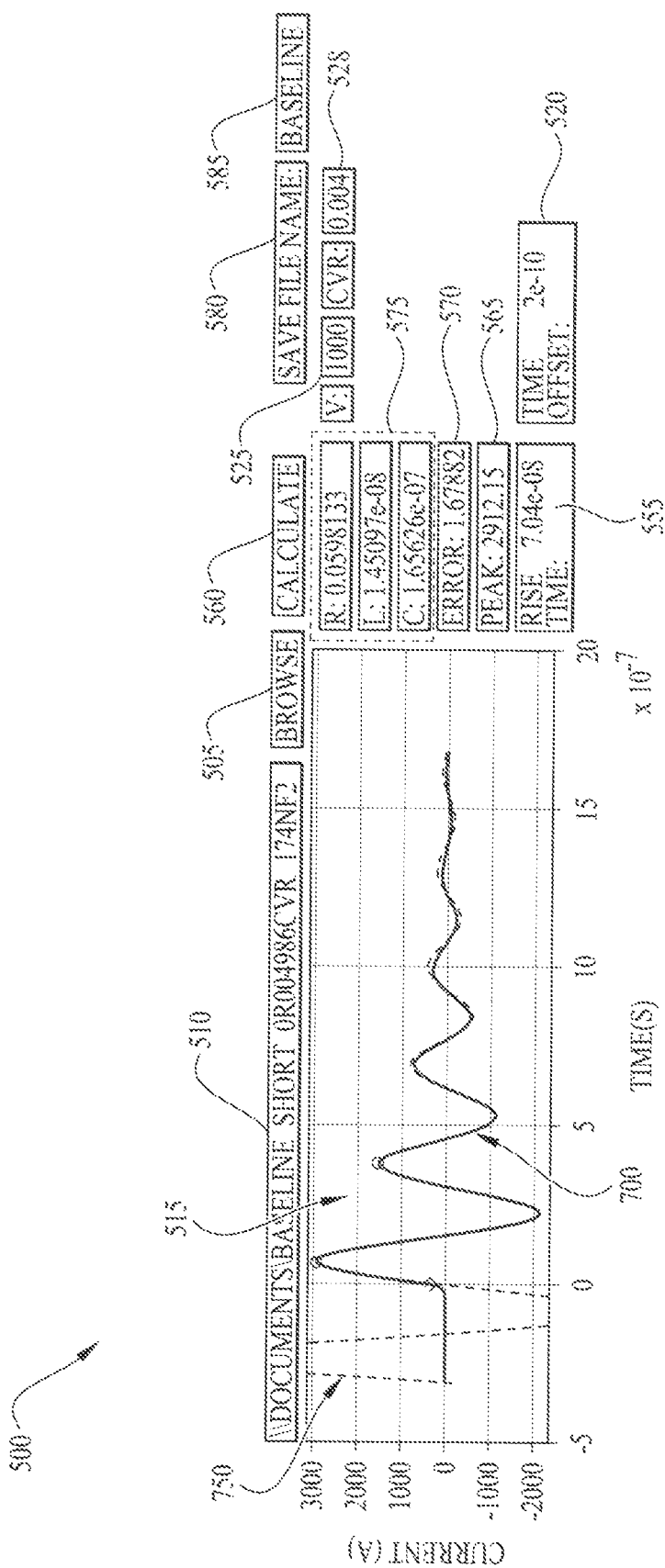
FIG. 7 is an illustration of one embodiment of the first interface of the graphical user interface and depicts an example of the graphical user interface analyzing waveform data.

FIG. 7 is an illustration of one embodiment of the first interface 501 of the graphical user interface 500 and depicts an example of the graphical user interface 500 analyzing waveform data 30. As discussed above, a user may upload waveform data 30 by selecting the source file associated with the waveform data 30 (e.g., .csv file) via the first browse button 505. Subsequently, the folder path and source file may also be displayed in the first folder path field 510, as shown in FIG. 7. The processor 101 locates the waveform data 30, plots the waveform, and performs adjustments. Thus, as shown in the first display region 515 of the graphical user interface 500, the plotted waveform 700 may be plotted based on the waveform data 30 and may be displayed as a two-dimensional plot of current over the time domain.

Importantly, FIG. 7 also depicts an adjusted waveform 750 superimposed with the plotted waveform 700 on the first display region 515. Here, in order to display meaningful information, the plotted waveform 700 may be adjusted or scaled over a range (e.g., approximately −2000 to 3000 A) and a proper time duration (−5 to $20\times10^{-7}$ seconds) within the first display region 515. This may require user input values, as for example, the maximum voltage charged or stored by a high voltage capacitor prior to discharge, which can be inputted in the first firing capacitor voltage field 525 (e.g., 1000 V). Another user input used for scaling or adjusting may be the current viewing resistance (CVR) used for measuring or recording the input signal associated with the waveform data 30. This resistance may be inputted within the CVR input field 528 (e.g., 0.004Ω). Further, the processor 101 may also adjust the plotted waveform 700 by time shifting the beginning of the leading edge of the pulse, such that the pulse edge starts at time zero. As a result, by obtaining the time difference of the leading edge of the adjusted waveform 750 from $t_0=0$ (i.e., when the time associated with the leading edge of the pulse waveform is zero), the time offset measurement may be obtained and displayed on the time offset field 520 (e.g., $2e^{-10}$ seconds).

Subsequently, the user may select the first calculate button 560, which preferably initializes and analyzes the waveform data 30. Using the (i) time offset measurement, (ii) initial frequency measurement, and (iii) user input values, multiple model data may be generated along with their corresponding percentage error values. The error percentage values may be used to determine which model data constitutes the ideal waveform (i.e., best-fit waveform) by selecting the model data having the least percentage error value. This percentage error value may be displayed in the first error percentage value field 570. For example, FIGS. 7 and 8 show the error percentage value of the first ideal waveform to be approximately 1.67882%.

Further, once the first ideal waveform 850 is determined, the associated RLC values may be derived from the first ideal waveform and shown within the first RLC value field 575. For example, FIGS. 7 and 8 shows that the resistance value, inductance value, and capacitance value for the first ideal waveform 750 to be 0.0598133 Ω, $1.45097e^{-8}$ H, $1.6566e^{-7}$ F, respectively. Other values may also be displayed such as the peak current in first peak field 565 (e.g., 2912.15 V) and rise time, which may be displayed in the first rise time field 545 ($7.04\ e^{-8}$ secs). The user may also save-a copy of the file and analysis by creating a new file name on field 585 and selecting button 580.

FIG. 8 is an illustration of one embodiment of the graphical user interface 500 and shows the graphical user interface 500 analyzing and comparing two waveforms. Using the same measurements shown above in FIG. 7 for the first plotted waveform 700, waveform data 30 associated with a second waveform may be uploaded into the computer system 2000 by selecting the source file associated with the second waveform data 30 via the second browse button 605. Subsequently, the folder path and name of the source file may also be displayed in the second folder path field 610, as shown in FIG. 2. As a result, the processor 101 locates the waveform data 30, plots the second waveform, and performs adjustments. Thus, as shown in the second display region 615 of the graphical user interface 500, a second plotted waveform 800 may be plotted based on the second waveform data and may be displayed as a two-dimensional plot of current over the time domain.

Importantly, FIG. 8 also depicts a second ideal waveform 850 superimposed with the second plotted waveform 800 on the second display region 615. Here, in order to display meaningful information, the second plotted waveform 800 may be adjusted or scaled over a meaningful range (e.g., approximately −1000 to 2000 A) and a proper time duration ($-5$ to $20\times10^{-7}$ seconds) within the second display region 615. This may require user input values, as for example, the maximum voltage charged or stored by a high voltage capacitor prior to discharge, which can be inputted in the second firing capacitor voltage field 625 (e.g., 1000 V). Another user input used for scaling the second plotted waveform 800 may be the CVR used for measuring or recording the input signal associated with the second waveform data 30. This resistance may be inputted within the second CVR input field 628 (e.g., 0.004Ω). Further, the processor 101 may also adjust the second plotted waveform 800 by time shifting the beginning of the leading edge of the pulse, such that the pulse edge starts at time zero. As a result, by obtaining the time difference of the leading edge of the second adjusted waveform 850 from $t_0=0$ (i.e., when the time associated with the leading edge of the pulse waveform is zero), the time offset may be obtained and displayed on the second time offset field 620 (e.g., $2.1\ e^{-9}$ seconds).

Subsequently, the user may select the second calculate button 660, which preferably initializes and analyzes the second waveform data 30. Using the (i) time offset measurement of the second plotted waveform 800, (ii) initial frequency measurement of the second plotted waveform 800, and (iii) user input values, multiple model data may be generated along with their corresponding percentage error values. These percentage error values may be used to determine the second ideal waveform (i.e., best-fit waveform) by selecting the model data having the least percentage error value. This percentage error value may be displayed in the second error percentage value field 670. For example, FIG. 8 shows the error percentage value of the second ideal waveform 850 to be approximately 1.88306%.

Further, once the second ideal waveform 850 is determined, the associated RLC values may be derived and shown within the second RLC fields 675. For example, FIG. 8 shows that the resistance, inductance, and capacitance values of the model data associated with the ideal waveform 850 to be 0.0784939 Ω, $1.90401e^{-8}$ H, $1.70976e^{-7}$ F, respectively. Other values may also be displayed such as the peak current in the second peak field 665 (e.g., 2527.08 A) and rise time, which may be displayed on the second rise time field 645 ($7.99\ e^{-8}$ secs).

Finally, the RLC values of the second ideal waveform 850 may be compared with the RLC values of the first ideal waveform 750 and shown in the RLC difference fields 699. In particular, the RLC difference fields 699 may depict the difference in resistance, inductance, and capacitance values between the first ideal waveform 750 and second ideal waveform 850. By way of example, FIG. 8 shows that the difference in resistance between the two waveforms is 0.0186806Ω; difference in inductance between the two waveforms is $4.5304\ e^{-9}$ H; and difference in capacitance values between the two waveforms to be $5.35\ e^{-9}$ F. In other embodiments, the RLC difference can be displayed in percentages rather than RLC values. Upon completion of the analysis of the second waveform data 30, the user can save a copy of the file and analysis by creating a new file name on field 585 and selecting button 580.

The foregoing description of the embodiments of the computer-implemented method for deriving RLC values of an RLC equivalent circuit model associated with a fireset has been presented for the purposes of illustration and description. While multiple embodiments of the computer-implemented method am disclosed, other embodiments will become apparent to those skilled in the art from the above detailed description. As will be realized, these embodiments are capable of modifications in various obvious aspects, all without departing from the spirit and scope of the present disclosure. Accordingly, the detailed description is to be regarded as illustrative in nature and not restrictive.

Although embodiments of the computer-implemented method are described in considerable detail, other versions are possible. Therefore, the spirit and scope of the appended claims should not be limited to the description of versions included herein.

Except as stated immediately above, nothing, which has been stated or illustrated, is intended or should be interpreted to cause a dedication of any component, step, feature, object, benefit, advantage, or equivalent to the public, regardless of whether it is or is not recited in the claims. The scope of protection is limited solely by the claims that now follow, and that scope is intended to be broad as is reasonably consistent with the language that is used in the claims. The scope of protection is also intended to be brad to encompass all structural and functional equivalents.

What is claimed as new and desired to be protected by Letters Patent is set forth in the appended claims:

1. A computer-implemented method for deriving resistance, inductance, and capacitance (RLC) values of an RLC equivalent circuit model associated with a fireset, the steps comprising:
    acquiring, using one or more processors, waveform data of a current discharge pulse used to execute a fireset, said waveform data being stored in a memory unit;
    plotting, using said one or more processors, a waveform based on said waveform data;
    adjusting, using said one or more processors, said plotted waveform by:
        (1) time-shifting said plotted waveform, such that a time associated with a leading edge of a pulse is zero, and
        (2) scaling said plotted waveform based on one or more user input values;
    determining, using said one or more processors, a time offset measurement based on said time-shifting sub-step and an initial frequency measurement based on said scaling sub-step;
    based on (i) said time offset measurement, (ii) said initial frequency measurement, and (iii) said one or more user input values, generating, using said one or more processors, a plurality of model data;
    determining, using said one or more processors, a plurality of percentage error values corresponding to said plurality of model data by comparing said plurality of model data with said waveform data, wherein said plurality of percentage error values is stored in said memory unit;
    determining, using said one or more processors, an ideal waveform by selecting a least of said plurality of percentage error values and associated model data; and
    deriving, using said one or mom processors, RLC values from said ideal waveform and said associated model data.

2. The computer-implemented method, according to claim 1, wherein said generating step of said plurality of model data is performed by the steps, comprising:
    creating, using said one or more processors, a time offset array having a plurality of time offset values incrementally associated with said time offset measurement, said time offset array being associated with a first loop construct to be iteratively executed for at least n times, wherein n is a number of said time offset values;
    creating, using said one or more processors, a frequency shift array having a plurality of frequency shift-values incrementally associated with said initial frequency measurement, said frequency shift array being associated with a second loop construct to be iteratively executed for at least p×n times, wherein p is a number of said frequency shift values;
    creating, using said one or more processors, a magnitude shift array having a plurality of magnitude shift values incrementally associated with each other, said magnitude shift array being associated with a third loop construct to be iteratively executed for at least p×n×q times, wherein q is a number of said magnitude shift values;
    for each loop iteration of said n times, executing said first loop construct by:
        applying each of said plurality of time offset values to said waveform data; and
        executing each loop iteration of said second loop construct at least p×n times, wherein each loop iteration of said second loop construct is executed by:
            applying each of said plurality of frequency shift values to said waveform data; and
            executing each loop iteration of said third loop construct at least p×n×q times, wherein each loop iteration of said third loop construct is executed by applying each of said plurality of magnitude shift values to said waveform data; and
    generating, using said one or more processors, said plurality of model data based on said one or more user input values, said plurality of time offset values, said plurality of frequency shift values, and said plurality of magnitude shift values.

3. The computer-implemented method, according to claim 1, wherein each of said plurality of model data is derived based on an equation illustrated below:

$$i = \frac{V_i}{L\omega} \times e^{-\alpha} \sin(\omega t)$$

wherein $V_1$ is an initial voltage of said current discharge pulse;

wherein R is a resistance, L is an inductance, and C is a capacitance of said RLC equivalent circuit model; and wherein:

$$\alpha = \frac{R}{2L}$$

$$\omega = \left(\frac{1}{CL} - \frac{R^2}{4L^2}\right)^{0.5} = \left(\frac{1}{CL} - \alpha^2\right).$$

4. The computer-implemented method, according to claim 1, wherein said initial frequency is derived based on equation illustrated below:

$$f_0 = 2\pi\left(\frac{1}{t_1} - \frac{1}{t_0}\right),$$

wherein $f_0$ is the initial frequency and $t_1$ and $t_0$ are time values occurring at first and second peaks of two highest amplitudes of said adjusted waveform.

5. The computer-implemented method, according to claim 1, wherein said one or mom user input values is selected from the group of user input values consisting of: an initial firing capacitor voltage and a current viewing resistance.

6. The computer-implemented method, according to claim 1, further comprising the step of:
    displaying in a display region of a display unit, said ideal waveform and said plotted waveform, such that said ideal waveform is superimposed with said plotted waveform.

7. A computer-implemented method for deriving RLC values of an RLC equivalent circuit model associated with a fireset, the steps comprising:
  acquiring, using one or more processors, waveform data of a current discharge pulse used to execute a fireset, said waveform data being stored in a memory unit;
  plotting, using said one or more processors, a waveform based on said waveform data;
  adjusting, using said one or more processors, said plotted waveform by:
    (1) time-shifting said plotted waveform, such that a time associated with a leading edge of a pulse is zero, and
    (2) scaling said plotted waveform based on one or more user input values;
  determining, using said one or more processors, a time offset measurement based on said time-shifting sub-step and an initial frequency measurement based on said scaling sub-step;
  based on (i) said time offset measurement, (ii) said initial frequency measurement, and (iii) said one or more user input values, generating, using said one or more processors, a plurality of model data;
  determining, using said one or more processors, a plurality of percentage error values corresponding to said plurality of model data by comparing said plurality of model data with said waveform data, wherein said plurality of percentage error values is stored in said memory unit;
  determining, using said one or more processors, an ideal waveform by selecting a least of said plurality of percentage error values and associated model data;
  deriving, using said one or more processors, RLC values from said ideal waveform and said associated model data; and
  displaying in a display region using a display unit, said ideal waveform and said plotted waveform, such that said ideal waveform is superimposed with said plotted waveform.

8. The computer-implemented method, according to claim 7, wherein said generating step of said plurality of model data is performed by the steps, comprising:
  creating, using said one or more processors, a time offset array having a plurality of time offset values incrementally associated with said time offset measurement, said time offset array being associated with a first loop construct to be iteratively executed for at least n times, wherein n is a number of said time offset values;
  creating, using said one or more processors, a frequency shift array having a plurality of frequency shift values incrementally associated with said initial frequency measurement, said frequency shift array being associated with a second loop construct to be iteratively executed for at least p×n times, wherein p is a number of said frequency shift values;
  creating, using said one or more processors, a magnitude shift array having a plurality of magnitude shift values incrementally associated with each other, said magnitude shift array being associated with a third loop construct to be iteratively executed for at least p×n×q times, wherein q is a number of said magnitude shift values;
  for each loop iteration of said n times, executing said first loop construct by:
    applying each of said plurality of time offset values to said waveform data; and
  executing each loop iteration of said second loop construct at least p×n times, wherein each loop iteration of said second loop construct is executed by:
    applying each of said plurality of frequency shift values to said waveform data; and
  executing each loop iteration of said third loop construct at least p×n×q times, wherein each loop iteration of said third loop construct is executed by applying each of said plurality of magnitude shift values to said waveform data; and
  generating said plurality of model data based on said one or more user input values, said plurality of time offset values, said plurality of frequency shift values, and said plurality of magnitude shift values.

9. The computer-implemented method, according to claim 8, wherein each of said plurality of model data is derived based on an equation illustrated below:

$$i = \frac{V_I}{L\omega} \times e^{-\alpha t} \sin(\omega t)$$

wherein $V_I$ is an initial voltage of said current discharge pulse;
wherein R is a resistance, L is an inductance, and C is a capacitance of said RLC equivalent circuit model; and
wherein:

$$\alpha = \frac{R}{2L}$$

$$\omega = \left(\frac{1}{CL} - \frac{R^2}{4L^2}\right)^{0.5} = \left(\frac{1}{CL} - \alpha^2\right).$$

10. The computer-implemented method, according to claim 9, wherein said initial frequency is derived based on equation illustrated below:

$$f_0 = 2\pi\left(\frac{1}{t_1} - \frac{1}{t_0}\right).$$

wherein $f_0$ is the initial frequency and $t_1$ and $t_0$ are time values occurring at first and second peaks of two highest amplitudes of said adjusted waveform.

11. The computer-implemented method, according to claim 10, wherein said one or more user input values is selected from the group of user input values consisting of: an initial firing capacitor voltage and a current viewing resistance.

12. The computer-implemented method, according to claim 11, further comprising the step of:
  displaying, using said one or more processors, one or more ideal waveform characteristics in a display region of a display unit,
  wherein said one or more ideal waveform characteristics are selected from the group of ideal waveform characteristics consisting of: said ideal RLC values of said ideal waveform, said percentage error value of said ideal waveform, and said time offset measurement.

13. A computer-implemented method for deriving RLC values of an RLC equivalent circuit model associated with a fireset, the steps comprising:

acquiring, using one or more processors, waveform data of an input signal from a digital storage oscilloscope, said input signal being associated with a current discharge pulse for execution of a fireset;

storing, using a memory unit, said waveform data;

plotting, using said one or more processors, a waveform based on said waveform data;

adjusting, using said one or more processors, said plotted waveform by:
(1) time-shifting said plotted waveform, such that a time associated with a leading edge of a pulse is zero, and
(2) scaling said plotted waveform based on one or more user input values;

determining, using said one or more processors, a time offset measurement based on said time-shifting substep and an initial frequency measurement based on said scaling sub-step;

based on (i) said time offset measurement, (ii) said initial frequency measurement, and (iii) said one or more user input values, generating, using said one or more processors, a plurality of model data;

determining, using said one or more processors, a plurality of percentage error values corresponding to said plurality of model data by comparing said plurality of model data with said waveform data, wherein said plurality of percentage error values is stored in said memory unit;

determining, using said one or more processors, an ideal waveform by selecting a least of said plurality of percentage error values and associated model data;

deriving, using said one or more processors, RLC values from said ideal waveform and said associated model data; and displaying, using said one or more processors, one or more ideal waveform characteristics in a display region of a display unit, wherein said one or more ideal waveform characteristics are selected from the group of ideal waveform characteristics consisting of: said ideal RLC values of said ideal waveform, said percentage error value of said ideal waveform, and said time offset measurement; and displaying in said display region using said display unit, said ideal waveform and said plotted waveform, such that said ideal waveform is superimposed with said plotted waveform.

14. The computer-implemented method, according to claim 13, wherein said generating step of said plurality of model data is performed by the steps, comprising:

creating, using said one or more processors, a time offset array having a plurality of time offset values incrementally associated with said time offset measurement, said time offset array being associated with a first loop construct to be iteratively executed for at least n times, wherein n is a number of said time offset values;

creating, using said one or more processors, a frequency shift array having a plurality of frequency shift values incrementally associated with said initial frequency measurement, said frequency shift array being associated with a second loop construct to be iteratively executed for at least p×n times, wherein p is a number of said frequency shift values;

creating, using said one or more processors, a magnitude shift array having a plurality of magnitude shift values incrementally associated with each other, said magnitude shift array being associated with a third loop construct to be iteratively executed for at least p×n×q times, wherein q is a number of said magnitude shift values;

for each loop iteration of said n times, executing said first loop construct by:
applying each of said plurality of time offset values to said waveform data; and
executing each loop iteration of said second loop construct at least p×n times, wherein each loop iteration of said second loop construct is executed by:
applying each of said plurality of frequency shift values to said waveform data; and
executing each loop iteration of said third loop construct at least p×n×q times, wherein each loop iteration of said third loop construct is executed by applying each of said plurality of magnitude shift values to said waveform data; and generating said plurality of model data based on said one or more user input values, said plurality of time offset values, said plurality of frequency shift values, and said plurality of magnitude shift values.

15. The computer-implemented method, according to claim 14, wherein each of said plurality of model data is derived based on an equation illustrated below:

$$i = \frac{V_i}{L\omega} \times e^{-\alpha t} \sin(\omega t)$$

wherein $V_i$ is an initial voltage of said current discharge pulse;

wherein R is a resistance, L is an inductance, and C is a capacitance of said RLC equivalent circuit model; and wherein:

$$\alpha = \frac{R}{2L}$$

$$\omega = \left(\frac{1}{CL} - \frac{R^2}{4L^2}\right)^{0.5} = \left(\frac{1}{CL} - \alpha^2\right).$$

16. The computer-implemented method, according to claim 15, wherein said initial frequency is derived based on equation illustrated below:

$$f_0 = 2\pi\left(\frac{1}{t_1} - \frac{1}{t_0}\right),$$

wherein $f_0$ is the initial frequency and $t_1$ and $t_0$ are time values occurring at first and second peaks of two highest amplitudes of said adjusted waveform.

17. The computer-implemented method, according to claim 16, wherein said one or more user input values is selected from the group of user input values consisting of: an initial firing capacitor voltage and a current viewing resistance.

* * * * *